(12) United States Patent
Kurokawa

(10) Patent No.: US 10,000,227 B2
(45) Date of Patent: Jun. 19, 2018

(54) ELECTRIC POWER STEERING DEVICE AND METHOD FOR ASSEMBLING THE SAME

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 69 days.

(21) Appl. No.: 15/102,920

(22) PCT Filed: Jan. 9, 2015

(86) PCT No.: PCT/JP2015/050530
§ 371 (c)(1),
(2) Date: Jun. 9, 2016

(87) PCT Pub. No.: WO2015/133168
PCT Pub. Date: Sep. 11, 2015

(65) Prior Publication Data
US 2016/0304111 A1 Oct. 20, 2016

(30) Foreign Application Priority Data

Mar. 5, 2014 (JP) ................................ 2014-043293
Aug. 6, 2014 (JP) ................................ 2014-160032

(51) Int. Cl.
*B62D 1/16* (2006.01)
*G01L 3/10* (2006.01)
(Continued)

(52) U.S. Cl.
CPC ............... *B62D 1/16* (2013.01); *B62D 1/185* (2013.01); *B62D 5/0409* (2013.01); *B62D 6/10* (2013.01); *F16D 1/06* (2013.01); *G01L 3/10* (2013.01)

(58) Field of Classification Search
CPC ........ B62D 1/16; B62D 1/185; B62D 5/0409; B62D 6/10
See application file for complete search history.

(56) References Cited

U.S. PATENT DOCUMENTS 6,988,582 B2 * 1/2006 Kitami ................. B62D 5/0409
                                                                180/444
9,557,234 B2 * 1/2017 Tsunoda .................... G01L 3/04
(Continued)

FOREIGN PATENT DOCUMENTS

CN         203450195 U    2/2014
DE       102011054983 A1   5/2013
(Continued)

OTHER PUBLICATIONS

Written Opinion, issued by International Searching Authority in corresponding International Application No. PCT/JP2015/050530, dated Apr. 7, 2015.(PCT/ISA/237).
(Continued)

*Primary Examiner* — Faye M Fleming
(74) *Attorney, Agent, or Firm* — Sughrue Mion, PLLC

(57) ABSTRACT

A cylindrical buckling prevention member is fitted on a spring shaft portion of a torsion bar, and an outer peripheral surface of the buckling prevention member is positioned close to or in contact with an inner peripheral surface of a hollow output shaft. Accordingly, when one of a pair of coupling shaft portions, which are axially end portions of the torsion bar, to be coupled to a coupling hole of a counter-shaft later is press-fitted into the coupling hole of the counter-shaft, the spring shaft portion of the torsion bar can be prevented from buckling.

17 Claims, 24 Drawing Sheets

(51) Int. Cl.
  *B62D 5/04*   (2006.01)
  *B62D 6/10*   (2006.01)
  *B62D 1/185*  (2006.01)
  *F16D 1/06*   (2006.01)

(56) References Cited

U.S. PATENT DOCUMENTS

| | | | |
|---|---|---|---|
| 2004/0084865 | A1 | 5/2004 | Kitami et al. |
| 2007/0235246 | A1* | 10/2007 | Kawaike ........... B60R 25/02105 180/443 |
| 2010/0147619 | A1 | 6/2010 | Chandy et al. |
| 2017/0072988 | A1* | 3/2017 | Strobel .................. B62D 5/083 |
| 2017/0253264 | A1* | 9/2017 | Kurokawa ........... B62D 5/0409 |

FOREIGN PATENT DOCUMENTS

| | | |
|---|---|---|
| EP | 1327569 A2 | 7/2003 |
| JP | 2003-207029 A | 7/2003 |
| JP | 2007-302066 A | 11/2007 |
| JP | 2010-36678 A | 2/2010 |
| JP | 2010-89709 A | 4/2010 |
| JP | 2010-122096 A | 6/2010 |
| WO | 03/104065 A1 | 12/2003 |
| WO | 2006/048392 A1 | 5/2006 |
| WO | 2007/051510 A1 | 5/2007 |

OTHER PUBLICATIONS

International Search Report, issued by International Searching Authority in corresponding International Application No. PCT/JP2015/050530, dated Apr. 7, 2015. (PCT/ISA/210).

Office Action dated Mar. 31, 2017 by the State Intellectual Property Office of P.R. China in counterpart Chinese Patent Application No. 201580003025.X.

Communication dated Jan. 2, 2017, from the European Patent Office in counterpart European Application No. 15757733.9.

* cited by examiner

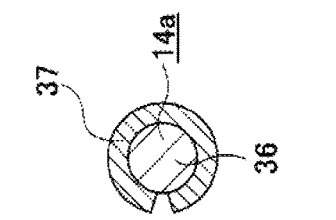
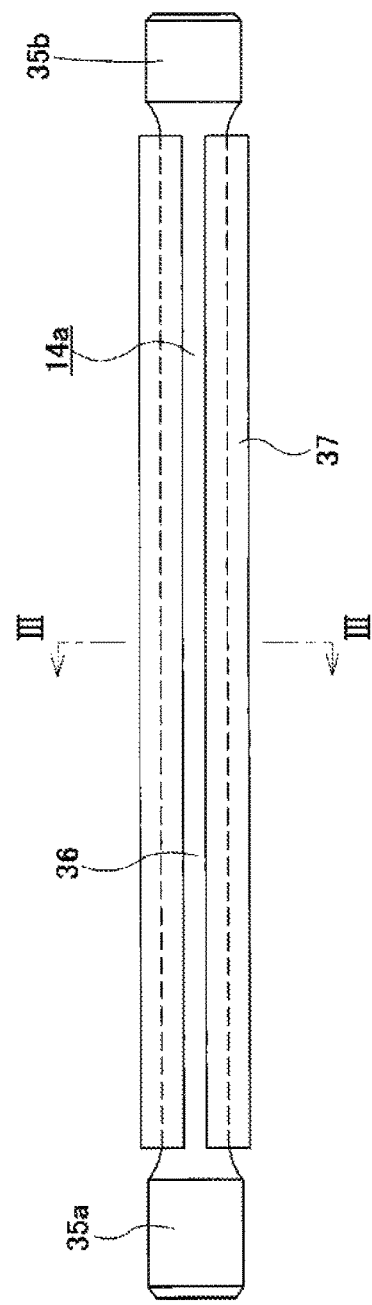

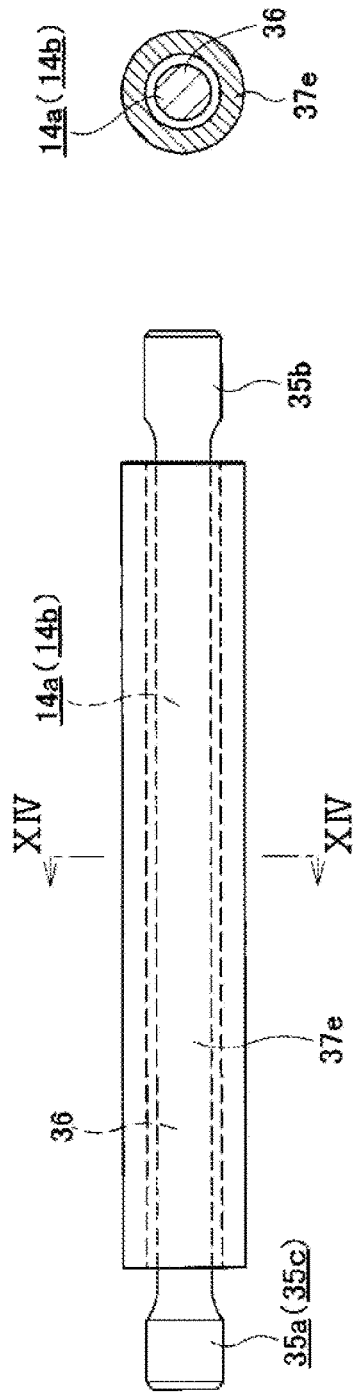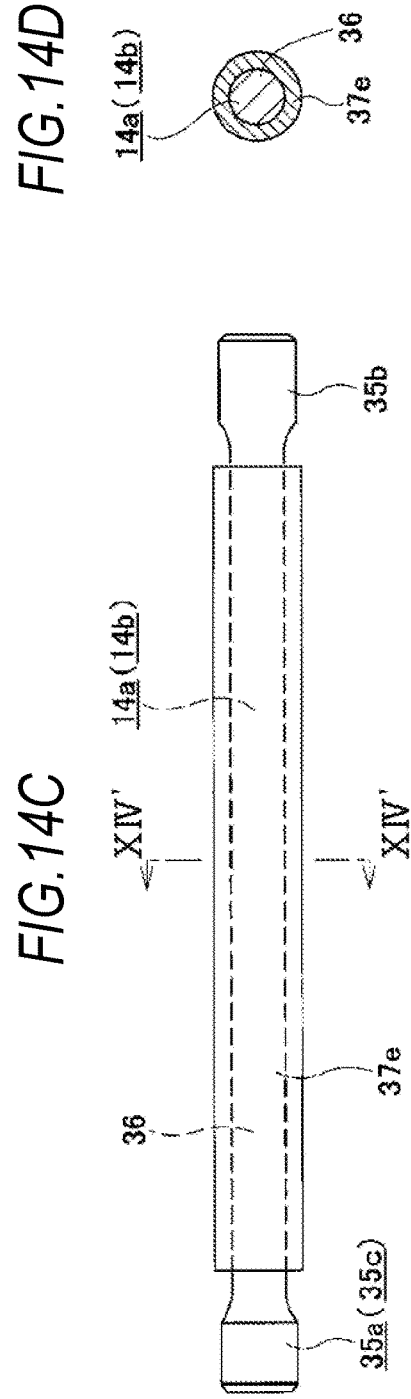

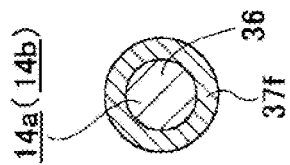
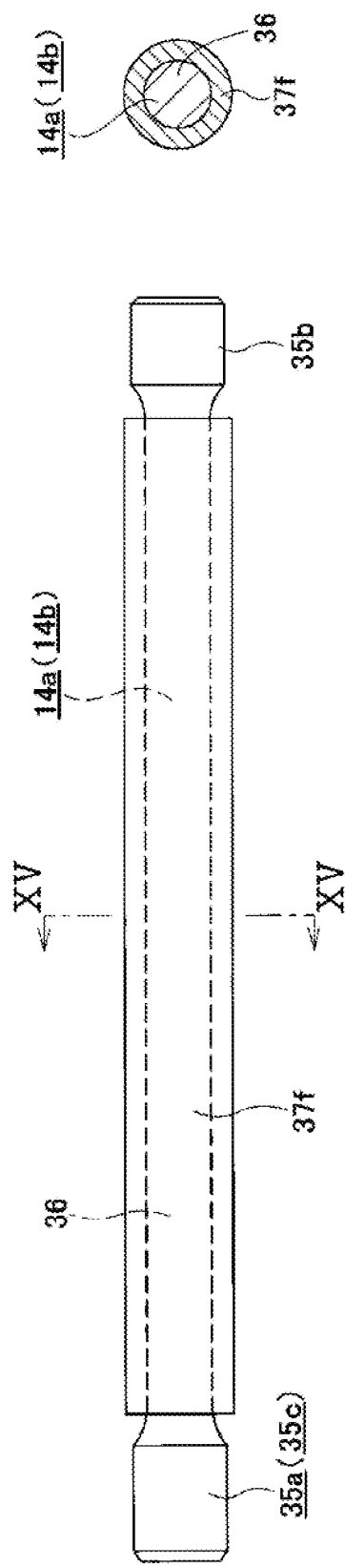

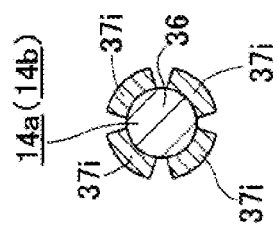
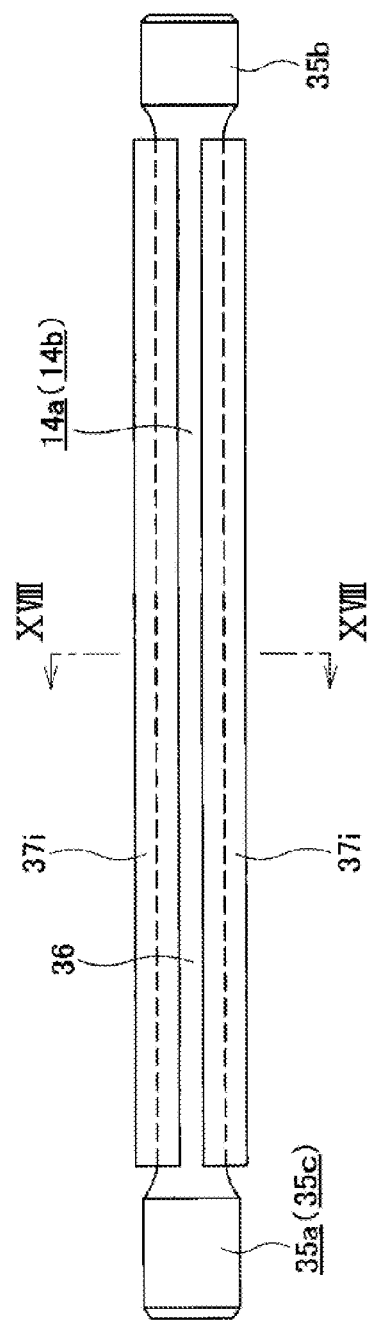
FIG.18A
FIG.18B

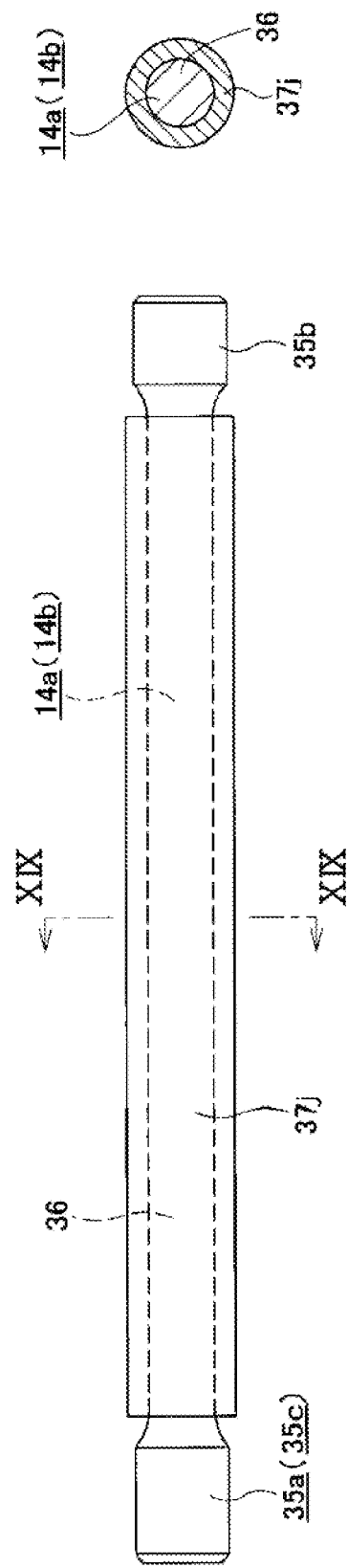

ELECTRIC POWER STEERING DEVICE AND METHOD FOR ASSEMBLING THE SAME

TECHNICAL FIELD

The present invention relates to an electric power steering device configured to reduce a force, which is necessary for a driver to operate a steering wheel, by using an electric motor as a generation source of auxiliary power, and a method for assembling the same.

BACKGROUND ART

As a steering device for applying a steering angle to steered wheels of an automobile, there has been widely known a structure shown in FIG. 28. In the steering device, a steering shaft 3 is rotatably supported to an inner diameter side of a cylindrical steering column 2 supported to a vehicle body 1. A steering wheel 4 is fixed to a rear end portion of the steering shaft 3 protruding from a rear end opening of the steering column 2. When the steering wheel 4 is rotated, the rotation is transmitted to an input shaft 8 of a steering gear unit 7 via the steering shaft 3, a universal joint 5a, an intermediate shaft 6 and a universal joint 5b. When the input shaft 8 is rotated, a pair of tie rods 9, 9 arranged at both sides of the steering gear unit 7 is pushed and pulled, so that a steering angle corresponding to an operation amount of the steering wheel 4 is applied to a pair of left and right steered wheels.

In this specification, a front-rear direction indicates a front-rear direction of a vehicle, unless particularly otherwise mentioned.

The example of FIG. 28 shows an electric power steering device configured to reduce an operating force of the steering wheel 4 by using an electric motor 10 as an auxiliary power source. Therefore, a housing 11 is fixed to a front end portion of the steering column 2, the electric motor 10 is supported to the housing 11 and a plurality of constitutional components are provided in the housing 11.

As shown in FIG. 29, the constitutional components include an input shaft 12 to which a steering force is applied from the steering wheel 4 (FIG. 28), a hollow output shaft 13 to which auxiliary power is applied using the electric motor 10 (FIG. 28) as a generation source, a torsion bar 14 arranged at an inner diameter side of the output shaft 13 and having both end portions coupled to the output shaft 13 and the input shaft 12, respectively, such that torque can be transmitted, a torque detector configured to detect the steering force based on elastic torsional deformation of the torsion bar 14, and the like (for example, refer to Patent Document 1). The input shaft 12 and the output shaft 13 are coupled to each other while a relative rotation is restrained within a predetermined angle range by engaging male and female stopper portions 15, 16 provided at axial end portions thereof with a circumferential gap therebetween.

When assembling the input shaft 12, the output shaft 13 and the torsion bar 14 shown in FIG. 29, a rear end portion (a right end portion in FIG. 29) of the torsion bar 14 is first press-fitted into a coupling hole 17 provided at an inner diameter side of the input shaft 12 to couple the rear end portion of the torsion bar 14 to the input shaft 12 such that torque can be transmitted. Then, the torsion bar 14 is inserted into a center hole 18 of the output shaft 13, and a front end portion (a left end portion in FIG. 29) of the torsion bar 14 is fitted into a coupling hole 19 provided at a front end portion of the center hole 18 without interference. The male and female stopper portions 15, 16 are engaged with a circumferential gap therebetween. Then, at a state where a positional relation between the input shaft 12 and the output shaft 13 in a rotating direction is adjusted to a center position of the predetermined angle range, a diametrical through hole 20 is formed at matching positions of the front end portion of the output shaft 13 and the front end portion of the torsion bar 14 by drilling processing. Then, a pin 21 is press-fitted into the through hole 20 to couple the front end portion of the torsion bar 14 to the output shaft 13 such that torque can be transmitted.

According to the above related-art structure and method for assembling the same, it is necessary to restrain the positional relation between the input shaft 12 and the output shaft 13 in the rotating direction and to form the through hole 20 with keeping the restrained positional relation. For this reason, dedicated jig and equipment are required when forming the through hole 20, which increases the cost.

In view of this situation, when assembling the above related-art structure, if the front end portion of the torsion bar 14 and the output shaft 13 are coupled by the pin 21 and then the rear end portion of the torsion bar 14 is press-fitted into the coupling hole 17 of the input shaft 12, the dedicated jig and equipment are not required when forming the through hole 20, so that it is possible to reduce the cost.

However, in this case, when press-fitting the rear end portion of the torsion bar 14 into the coupling hole 17 of the input shaft 12, a high axial compressive force is applied to a spring shaft portion, which is an axially intermediate portion of the torsion bar 14. For this reason, it is necessary to increase the stiffness of the spring shaft portion so as to prevent the spring shaft portion from buckling due to the high axial compressive force. On the other hand, if the stiffness of the spring shaft portion is increased, the vibration is more likely to be transmitted from the steered wheels to the steering wheel 4 through the spring shaft portion and the detection sensitivity of the steering torque is lowered.

Incidentally, in the above related-art structure, if the coupling structure of the front end portion of the torsion bar 14 and the output shaft 13 is changed into a press-fitting coupling structure, the through hole 20 and the pin 21 are not required, so that the jig and equipment are not necessary. Further, a removing operation (cleaning operation) of chips (iron powders), which are generated when forming the through hole 20, is not required and the number of components can be reduced, so that it is possible to reduce the cost.

In this case, however, since both end portions of the torsion bar 14 are sequentially press-fitted into the two coupling holes 17, 19, if the press-fitting which is performed later is performed such that the first press-fitted end portion is axially pressed towards the end portion to be press-fitted later, a high axial compressive force is applied to the spring shaft portion of the torsion bar 14. Therefore, the problems similar to the above are caused.

Incidentally, Patent Document 2 is another background art document relating to the present invention. Patent Document 2 describes an electric power steering device having a configuration to which the present invention can be applied.

BACKGROUND ART DOCUMENT

Patent Document

Patent Document 1: JP-A-2010-89709
Patent Document 2: WO2003/104065

SUMMARY OF THE INVENTION

Problem to be Solved

The present invention has been made in view of the above circumstances, and an object is to provide an electric power steering device and a method for assembling the same capable of preventing a spring shaft portion of a torsion bar from buckling when press-fitting at least one of both axial end portions of the torsion bar into a coupling hole of a counter-shaft.

An electric power steering device of the present invention includes:

a hollow first shaft;

a second shaft which is arranged coaxially with the first shaft; and a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted, wherein at least one of the coupling shaft portions is press-fitted into a coupling hole formed in a counter-shaft which is one of the first and second shafts, to which the one of the coupling shaft portions is to be coupled, and wherein a steering force from a steering wheel is applied to either one of the first and second shafts.

In particular, in the electric power steering device of the present invention, a buckling prevention member is fitted and supported (including fitting and fixing) or coupled and fixed on an outer peripheral surface of the spring shaft portion, and an outer peripheral surface of the buckling prevention member is positioned close to or in contact with an inner peripheral surface of the first shaft.

In an embodiment to be described later, the second shaft is arranged coaxially with the first shaft with relative rotation to the first shaft being restrained within a predetermined angle range.

Also, another member (for example, the other one of the first and second shafts or a rack shaft configuring a steering gear unit) provided on a steering force transmission mechanism configured to transmit movement of a steering wheel to steered wheels is applied with auxiliary power of an electric motor as a generation source.

The buckling prevention member may be made of a material which is, for example, any of various metals (aluminum alloy, magnesium alloy, copper alloy, iron-based alloy and the like), a synthetic resin (polyacetal (POM), poly phenylene sulfide (PPS), polyamide (PA), polypropylene (PP), poly vinyl chloride (PVC), poly ethylene (PE), poly ethylene terephthalate (PET), poly tetrafluoroethylene (PTFE), poly amide imide (PAI), poly ether ether ketone (PEEK) and the like), rubber (natural rubber (NR), isoprene rubber (IR), butadiene rubber (BR), acrylonitrile butadiene rubber (NBR), styrene butadiene rubber (SBR), ethylene propylene rubber (EPDM, EPM), silicone rubber (Si, SR), fluorine rubber (FKM, FPM) and the like).

When implementing the electric power steering device of the present invention, the buckling prevention member is preferably fitted and supported or coupled and fixed on a portion including an axially center portion of the outer peripheral surface of the spring shaft portion.

When implementing the electric power steering device of the present invention, the buckling prevention member may be configured by a cylindrical member which is made of an elastic material and has a cut-out (discontinuous portion) extending in parallel or inclined with respect to a center axis thereof formed at one position in a circumferential direction.

Alternatively, the buckling prevention member may be configured by a cylindrical heat-shrinkable tube.

Alternatively, the buckling prevention member may be configured by a synthetic resin member which is injection-molded on an outer diameter side of the spring shaft portion.

Alternatively, the buckling prevention member may be configured by a rubber member which is vulcanization-bonded on the outer peripheral surface of the spring shaft portion.

Also, when implementing the electric power steering device of the present invention, a first stopper portion provided at one axial portion (an axial end portion or an axially intermediate portion) of the first shaft and a second stopper portion provided at one axial portion (an axial end portion or an axially intermediate portion) of the second shaft are preferably engaged with each other with a circumferential gap therebetween such that relative rotations of the first and second shafts are restrained within a predetermined angle range.

Also, the one of the coupling shaft portions is coupled to the first shaft such that torque can be transmitted and axial relative displacement is prevented. Incidentally, in order to implement this coupling manner, at a state where the one of the coupling shaft portions is fitted in a coupling hole formed in the first shaft, a pin is inserted into a diametrical through hole formed at a position where the one of the coupling shaft portions and the first shaft are matched, the one of the coupling shaft portions and the first shaft are welded or bonded to each other or engaged portions of the one of the coupling shaft portions and the first shaft are plastically deformed (crimped), for example.

Also, the other of the coupling shaft portions is press-fitted into a coupling hole formed in the second shaft.

Further, there is a size relation that at assembling, after the buckling prevention member is arranged between the outer peripheral surface of the spring shaft portion of the torsion bar and the inner peripheral surface of the first shaft and the one of the coupling shaft portions is coupled to the first shaft such that torque can be transmitted and axial relative displacement is prevented, and before press-fitting the other of the coupling shaft portions into the coupling hole formed in the second shaft, at least portions of the first and second stopper portions can be engaged with each other with a circumferential gap therebetween.

Also, when implementing the electric power steering device of the present invention, a first stopper portion provided at one axial portion (an axial end portion or an axially intermediate portion) of the first shaft and a second stopper portion provided at one axial portion (an axial end portion or an axially intermediate portion) of the second shaft are preferably engaged with each other with a circumferential gap therebetween such that relative rotations of the first and second shafts are restrained within a predetermined angle range.

Also, the one of the coupling shaft portions is press-fitted to a coupling hole formed in the first shaft.

Also, the other of the coupling shaft portions is press-fitted into a coupling hole formed in the second shaft and abuts on a bottom end portion of the coupling hole.

Further, there is a size relation that at assembling, at a state where the other of the coupling shaft portions is press-fitted into the coupling hole formed in the second shaft and abuts on the bottom end portion of the coupling hole, after the buckling prevention member is arranged between the outer peripheral surface of the spring shaft portion of the torsion bar and the inner peripheral surface of the first shaft and before press-fitting the one coupling shaft portion into the coupling hole formed in the first shaft, at least portions of the first and second stopper portions can be engaged with each other with a circumferential gap therebetween.

Also, when implementing the electric power steering device of the present invention, a first stopper portion provided at one axial portion (an axial end portion or an axially intermediate portion) of the first shaft and a second stopper portion provided at an axial portion (an axial end portion or an axially intermediate portion) of the second shaft are preferably engaged with each other with a circumferential gap therebetween such that relative rotations of the first and second shafts are restrained within a predetermined angle range.

Also, the one of the coupling shaft portions is press-fitted into a coupling hole formed in the first shaft.

Also, the other of the coupling shaft portions is press-fitted into a coupling hole formed in the second shaft and abuts on a bottom end portion of the coupling hole.

There is a size relation that at assembling, before press-fitting of the coupling shaft portions such that while press-fitting the other of the coupling shaft portions into the coupling hole formed in the second shaft to abut on the bottom end portion of the coupling hole and the one of the coupling shaft portions is press-fitted into the coupling hole formed in the first shaft after the torsion bar arranged with the buckling prevention member is inserted into the inner diameter side of the first shaft, at least portions of the first and second stopper portions can be engaged with each other with a circumferential gap therebetween.

Also, a method of assembling the electric power steering device of the present invention includes arranging the buckling prevention member between the outer peripheral surface of the spring shaft portion of the torsion bar and the inner peripheral surface of the first shaft and coupling the one of the coupling shaft portions to the first shaft such that torque can be transmitted and axial relative displacement is prevented. The method further includes engaging at least portions of the first and second stopper portions each other with a circumferential gap therebetween, and press-fitting the other of the coupling shaft portions into the coupling hole formed in the second shaft at a state where a positional relation between the first and second shafts in a rotating direction is adjusted to a center position of the predetermined angle range.

Also, a method of assembling the electric power steering device of the present invention includes arranging the buckling prevention member between the outer peripheral surface of the spring shaft portion of the torsion bar and the inner peripheral surface of the first shaft at a state where the other of the coupling shaft portions of the torsion bar is press-fitted into the coupling hole formed in the second shaft to abut on the bottom end portion of the coupling hole. The method further includes engaging at least portions of the first and second stopper portions each other with a circumferential gap therebetween and press-fitting the one of the coupling shaft portions into the coupling hole formed in the first shaft at a state where a positional relation between the first and second shafts in a rotating direction is adjusted to a center position of the predetermined angle range.

Also, a method of assembling the electric power steering device includes engaging at least portions of the first and second stopper portions each other with a circumferential gap therebetween, inserting the torsion bar arranged with the buckling prevention member into the inner diameter side of the first shaft at a state where a positional relation between the first and second shafts in a rotating direction is adjusted to a center position of the predetermined angle range, press-fitting the other of the coupling shaft portions into the coupling hole formed in the second shaft to abut on the bottom end portion of the coupling hole, and press-fitting the one of the coupling shaft portions into the coupling hole formed in the first shaft.

Effects of the Invention

According to the electric power steering device and the method for assembling the same of the present invention, when press-fitting one of coupling shaft portions, which is to be later coupled to a counter-shaft, of the pair of coupling shaft portions, which are both axial end portions of the torsion bar, into the coupling hole formed in a counter-shaft or when press-fitting the pair of coupling shaft portions into the coupling holes of the first and second shaft, it is possible to prevent the spring shaft portion, which is the axially intermediate portion of the torsion bar, from buckling.

That is, according to the present invention, when press-fitting the coupling shaft portion of the torsion bar into the coupling hole formed in the counter-shaft, the axially high compressive force may be applied to the spring shaft portion. However, even though the spring shaft portion tends to buckle due to the axially high compressive force, the outer peripheral surface of the buckling prevention member is in contact with or is to contact the inner peripheral surface of the first shaft, so that the buckling deformation is prevented.

Also, according to the present invention, since it is possible to prevent the buckling deformation of the spring shaft portion in this manner, it is possible to easily lower the stiffness of the torsion bar (to easily decrease the diameter of the spring shaft portion) so as to reduce the vibrations to be transmitted from the steered wheels to the steering wheel and to improve the detection sensitivity of the steering torque.

BRIEF DESCRIPTION OF THE DRAWINGS

FIG. 3A is a side view showing a torsion bar and a buckling prevention member, and FIG. 3B is a sectional view taken along a line of FIG. 3A.

FIG. 4 is a sectional view showing a stage of assembling some components such as an input shaft, an output shaft, the torsion bar, the buckling prevention member and the like.

FIG. 14A is a side view showing a torsion bar and a buckling prevention member of a seventh embodiment at a state before the buckling prevention member is thermally shrunk, FIG. 14B is a sectional view taken along a line XIV-XIV, FIG. 14C is a side view showing a state after the buckling prevention member is thermally shrunk, and FIG. 14D is a sectional view taken along a line XIV'-XIV'.

FIG. 15A is a side view of a torsion bar and a buckling prevention member of an eighth embodiment, and FIG. 15B is a sectional view taken along a line XV-XV of FIG. 15A.

FIG. 18A is a side view of a torsion bar and a buckling prevention member of an eleventh embodiment, and FIG. 18B is a sectional view taken along a line XVIII-XVIII of FIG. 18A.

FIG. 19A is a side view of a torsion bar and a buckling prevention member of a twelfth embodiment, and FIG. 19B is a sectional view taken along a line XIX-XIX of FIG. 19A.

DETAILED DESCRIPTION OF EMBODIMENTS

First Embodiment

Figure 28:
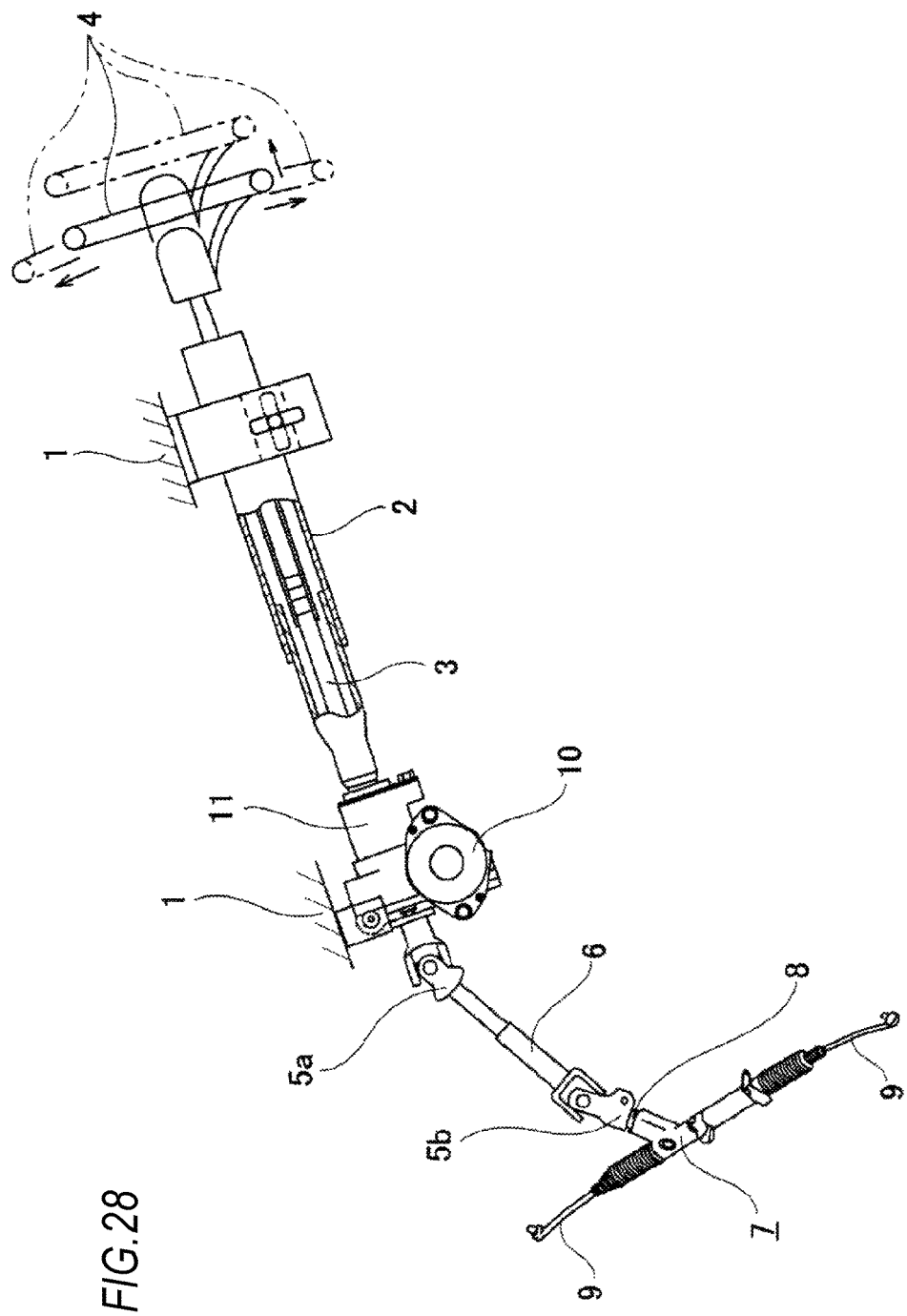
FIG. 28 is a partially cut side view showing a known electric power steering device.
Figure 29:
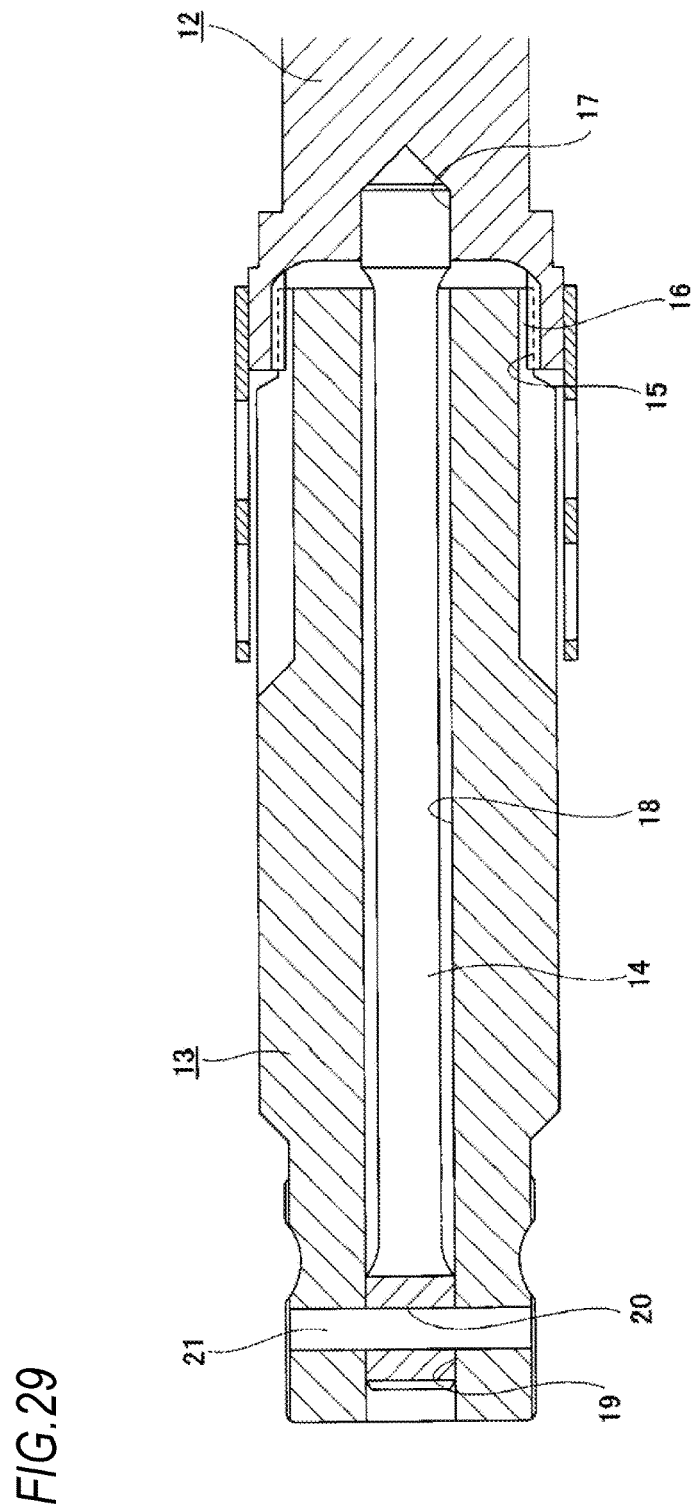
FIG. 29 is a sectional view showing some components such as an input shaft, an output shaft, a torsion bar and the like taken out from a housing of the known electric power steering device.

A first embodiment of the present invention is described with reference to FIGS. 1 to 6. In FIGS. 1 to 6, the left side is a front side and the right side is a rear side. An electric power steering device of the first embodiment has a steering column 2a, a steering shaft 3a, a housing 11a, an output shaft 13a, a torsion bar 14a, a buckling prevention member 37, a torque detection sleeve 22, a torque detection coil unit 23, an electric motor 10 (refer to FIG. 28), and a worm-type decelerator 24.

The steering column 2a is configured by telescopically combining a cylindrical inner column 25 arranged at the front side and a cylindrical outer column 26 arranged at the rear side, and is supported to a vehicle body by a support bracket 27. The inner column 25 and the outer column 26 are made of steel or light alloy such as aluminum alloy.

The steering shaft 3a is configured by spline-fitting a hollow upper shaft 29 arranged at the rear side to a lower shaft 28 arranged at the front side such that torque can be transmitted and axial relative displacement can be made, and is rotatably supported inside the steering column 2a. The lower shaft 28 and the upper shaft 29 are made of steel. A steering wheel 4 (refer to FIG. 28) is fixed to a rear end portion of the upper shaft 29 protruding from a rear end opening of the outer column 26.

The housing 11a is configured by coupling a front-side cover body 30 and a rear-side main body 31, each of which is made of light alloy such as aluminum alloy or synthetic resin, with a plurality of bolts 32, and is coupled and fixed to a front end portion of the inner column 25. A front end portion of the lower shaft 28 is inserted inside the housing 11a.

The output shaft 13a is made to have a hollow shape by steel, which is magnetic metal, and is rotatably supported to a front side of the lower shaft 28 in the housing 11a by a pair of ball bearings 33, 34. A universal joint 5a (refer to FIG. 28) is coupled to a front end portion of the output shaft 13a protruding from a front end opening of the housing 11a.

The torsion bar 14a is made of steel such as spring steel, and has a pair of coupling shaft portions at both axial end portions thereof and a spring shaft portion 36 at an axially intermediate portion thereof between the coupling shaft portions 35a, 35b. An outer diameter size of the spring shaft portion 36 is configured to be smaller than outer diameter sizes of both coupling shaft portions 35a, 35b over an entire length thereof. An outer peripheral surface of the spring shaft portion 36 is simply cylindrical at an axially intermediate portion thereof (which is a most portion of the outer peripheral surface except for both axial end portions), and both axial end portions thereof are inclined such that outer diameter sizes thereof increase as proceeding towards both coupling shaft portions 35a, 35b in the axial direction. At a state where the torsion bar 14a is arranged at the inner diameter side of the output shaft 13a, the front-side coupling shaft portion 35a is coupled to the output shaft 13a (the first shaft) and the rear-side coupling shaft portion 35b is coupled to the lower shaft 28 (the second shaft and the input shaft) such that torque can be transmitted.

In the first embodiment, in order to couple the front-side coupling shaft portion 35a to the output shaft 13a such that torque can be transmitted, the front-side coupling shaft portion 35a is fitted in a coupling hole 19a formed in a front end portion of a center hole 18a of the output shaft 13a. At this state, a pin 21a is press-fitted into a diametrical through hole 20a formed at a position where the front-side coupling shaft portion 35a and the front end portion of the output shaft 13a are matched. Also, in order to couple the rear-side coupling shaft portion 35b to the lower shaft 28 such that torque can be transmitted, the rear-side coupling shaft portion 35b is press-fitted in a bottomed coupling hole 17a formed in an inner diameter side of a front end side portion of the lower shaft 28. Thereby, male serration subject to hardening processing such as quenching and provided on an outer peripheral surface of the rear-side coupling shaft portion 35b is mechanically bitten to a cylindrical inner peripheral surface of the coupling hole 17a for which the hardening processing is not performed.

The buckling prevention member 37 is a cylindrical (partially cylindrical) member made of any of various metals, a synthetic resin, rubber and the like as described above and having a cut-out (discontinuous portion) in parallel with a center axis thereof at one position in a circumferential direction. The buckling prevention member 37 is close to or in contact with the cylindrical inner peripheral surface of the output shaft 13a at an outer peripheral surface thereof with being fitted and supported on the spring shaft portion 36 of the torsion bar 14a. In the first embodiment, an axial size of the buckling prevention member 37 is substantially the same as an axial size of the axially intermediate portion (which is a most portion of the spring shaft portion 36 except for both axial end portions and is a portion of which an outer peripheral surface is a simply cylindrical surface) of the spring shaft portion 36. An inner peripheral surface of the buckling prevention member 37 is in contact with the outer peripheral surface of the axially intermediate portion of the spring shaft portion 36. Meanwhile, in the first embodiment, the buckling prevention member 37 may be loosely fitted on the spring shaft portion 36 such that a slight gap is formed between the circumferential surfaces of both opposing members (portions) 37, 36.

The front end portion of the lower shaft 28 is provided with a cylindrical portion 38. An inner peripheral surface of the cylindrical portion 38 is provided with a female stopper portion 15a (the second stopper portion) having a circumferential concavo-convex shape (a toothed wheel shape). The female stopper portion 15a is configured by circumferentially arranging a plurality of female tooth portions and female recess portions, each of which is axially long, alternately and at an equal pitch on an inner peripheral surface of the cylindrical portion 38.

On the other hand, an outer peripheral surface of a rear end portion of the output shaft 13a is provided with a male stopper portion 16a (the first stopper portion) having a circumferential concavo-convex shape (a toothed wheel shape). The male stopper portion 16a is configured by circumferentially arranging a plurality of male tooth portions and male recess portions, each of which is axially long, alternately and at an equal pitch on the outer peripheral surface of the rear end portion of the output shaft 13a. The number of the male tooth portions (male recess portions) and the number of the female recess portions (female tooth portions) are the same.

The female stopper portion 15a and the male stopper portion 16a as described above are matingly engaged with each other such that relative rotation can be made (like loose spline engagement) within a predetermined angle range (for example, ±5° with respect to a neutral state where the spring shaft portion 36 of the torsion bar 14a is not distorted). That is, the respective female tooth portions (respective male tooth portions) are loosely engaged with the respective male recess portions (respective female recess portions) with gaps being respectively interposed at both circumferential sides, so that the relative rotations of the lower shaft 28 and the output shaft 13a are restrained within the predetermined angle range. Thereby, the spring shaft portion 36 of the torsion bar 14a is prevented from being excessively distorted.

Also, a rear end side portion of the outer peripheral surface of the output shaft 13a which is adjacent to a front side of the male stopper portion 16a in the axial direction, is provided with an torque detection concavo-convex portion 39 having a diameter of a circumscribed circle larger than the male stopper portion 16a and a circumferential concavo-convex shape (toothed wheel shape). The torque detection concavo-convex portion 39 is configured by forming a plurality of recess portions for detection, each of which is axially long, at an equal distance in the circumferential direction on the rear end side portion of the outer peripheral surface of the output shaft 13a. In the first embodiment, the number of the recess portions for detection and the number of the male recess portions configuring the male stopper portion 16a are the same. Also, the recess portions for detection and the male recess portions are continuously provided in the axial direction.

The torque detection sleeve 22 is made to have a cylindrical shape by conductive and non-magnetic metal such as aluminum alloy, and is concentrically arranged at an outer diameter side of the torque detection concavo-convex portion 39. A rear end portion, which is a base end portion of the torque detection sleeve 22, is fitted and fixed on the cylindrical portion 38. A plurality of window holes 40, 40 having a substantially rectangular shape and arranged in a plurality of lines in the axial direction and at an equal distance in the circumferential direction is formed from a front end portion to an intermediate portion of the torque detection sleeve 22, which are arranged at the outer diameter side of the torque detection concavo-convex portion 39. Circumferential pitches of the window holes 40, 40 in both lines are offset each other by a half pitch.

The torque detection coil unit 23 is cylindrical and is concentrically arranged at the outer diameter sides of the torque detection concavo-convex portion 39 and the torque detection sleeve 22. The torque detection coil unit 23 is fitted and fixed inside the housing 11a, and has a pair of coils 41, 41. Both the coils 41, 41 are arranged to diametrically overlap with portions of the torque detection sleeve 22, at which the window holes 40, 40 of both lines are provided.

The worm-type decelerator 24 is configured by combining a worm wheel 42 and a worm (not shown). The worm wheel 42 is fitted and fixed on a substantially axially center portion of the output shaft 13a between the ball bearings 33, 34. Also, the worm (not shown) is rotatably supported inside the housing 11a with being meshed with the worm wheel 42.

The electric motor 10 (refer to FIG. 28) is supported and fixed to the housing 11a. An output shaft of the electric motor 10 is coupled to a base end portion of the worm (not shown) such that torque can be transmitted.

In the electric power steering device of the first embodiment as described above, when assembling the lower shaft 28, the output shaft 13a, the torsion bar 14a and the buckling prevention member 37, the buckling prevention member 37 is first fitted and supported on the spring shaft portion 36 of the torsion bar 14a, as shown in FIG. 3. Here, the buckling prevention member 37 of the first embodiment is configured to elastically (or plastically) increase/decrease a width of the cut-out provided at one position in the circumferential direction and to elastically (or plastically) increase/decrease an inner diameter size based on the increase/decrease of the width. For this reason, it is possible to fit and support the buckling prevention member 37 on the spring shaft portion 36 by axially inserting the torsion bar 14a into the inner diameter side of the buckling prevention member 37 while the inner diameter size of the buckling prevention member 37 is enlarged or by diametrically inserting the spring shaft portion 36 into the inner diameter side of the buckling prevention member 37 through the cut-out while the width of the cut-out is enlarged and then decreasing the width of the cut-out.

Figure 1:
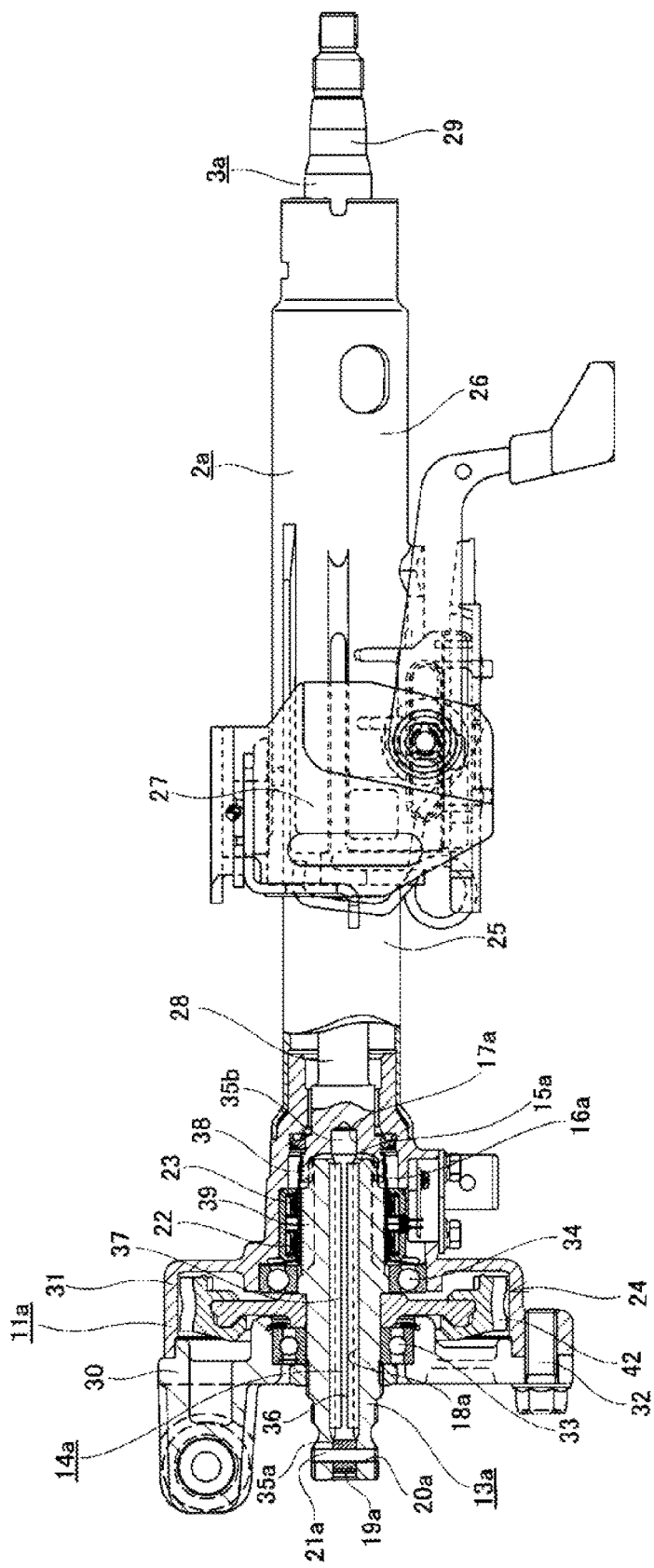
FIG. 1 is a partially cut side view showing a first embodiment of the present invention.
Figure 2:
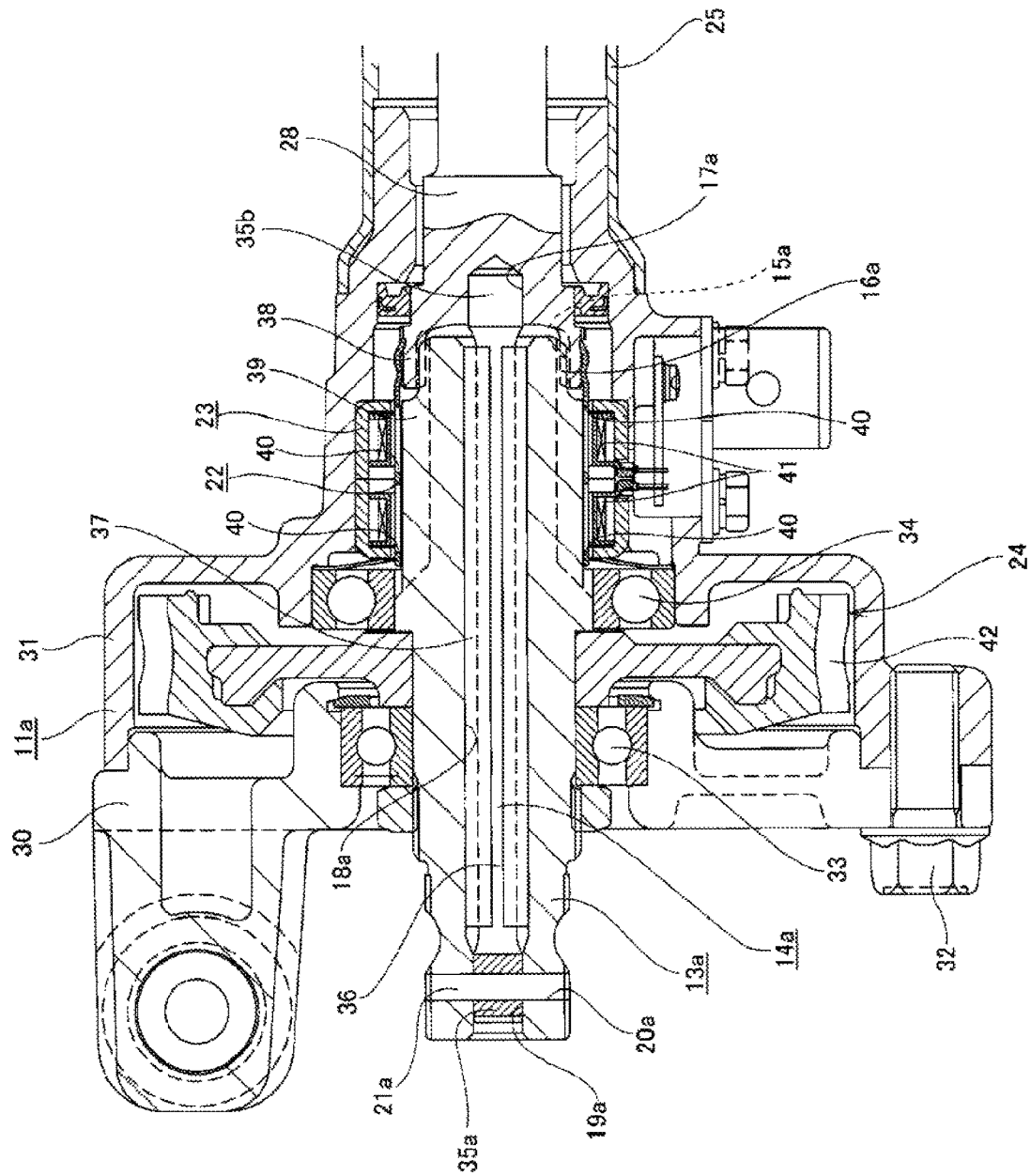
FIG. 2 is an enlarged view of a left end portion of FIG. 1.
Figure 4:
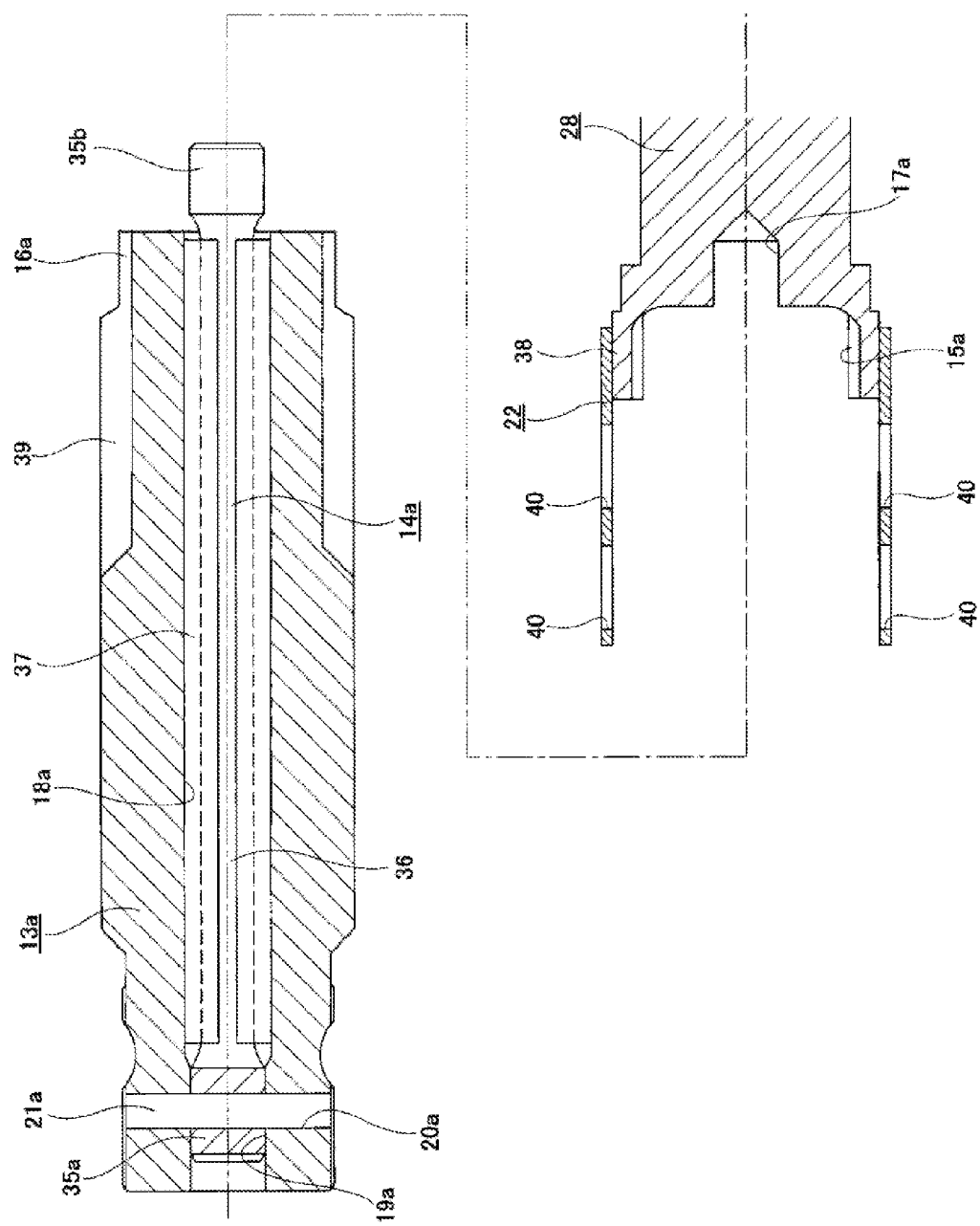

Then, as shown in the upper half part of FIG. 4, the torsion bar 14a and the buckling prevention member 37 are inserted into the inner diameter side of the output shaft 13a through the rear end opening of the center hole 18a of the output shaft 13a. Then, at a state where the front-side coupling shaft portion 35a of the torsion bar 14a is fitted in the coupling hole 19a of the output shaft 13a, the pin 21a is press-fitted into the diametrical through hole 20a formed at the portion where the coupling shaft portion 35a and the output shaft 13a are matched. Thereby, the coupling shaft portion 35a is coupled to the output shaft 13a such that torque can be transmitted and axial relative displacement is prevented. In the meantime, the portions of the through hole 20a corresponding to the coupling shaft portion 35a and the output shaft 13a may be formed at the same time with the coupling shaft portion 35a being fitted in the coupling hole 19a by drilling processing or may be formed separately before the assembling operation. Also, as shown in the lower half part of FIG. 4, the base end portion of the torque detection sleeve 22 is fitted and fixed on the cylindrical portion 38 of the lower shaft 28.

Figure 5:
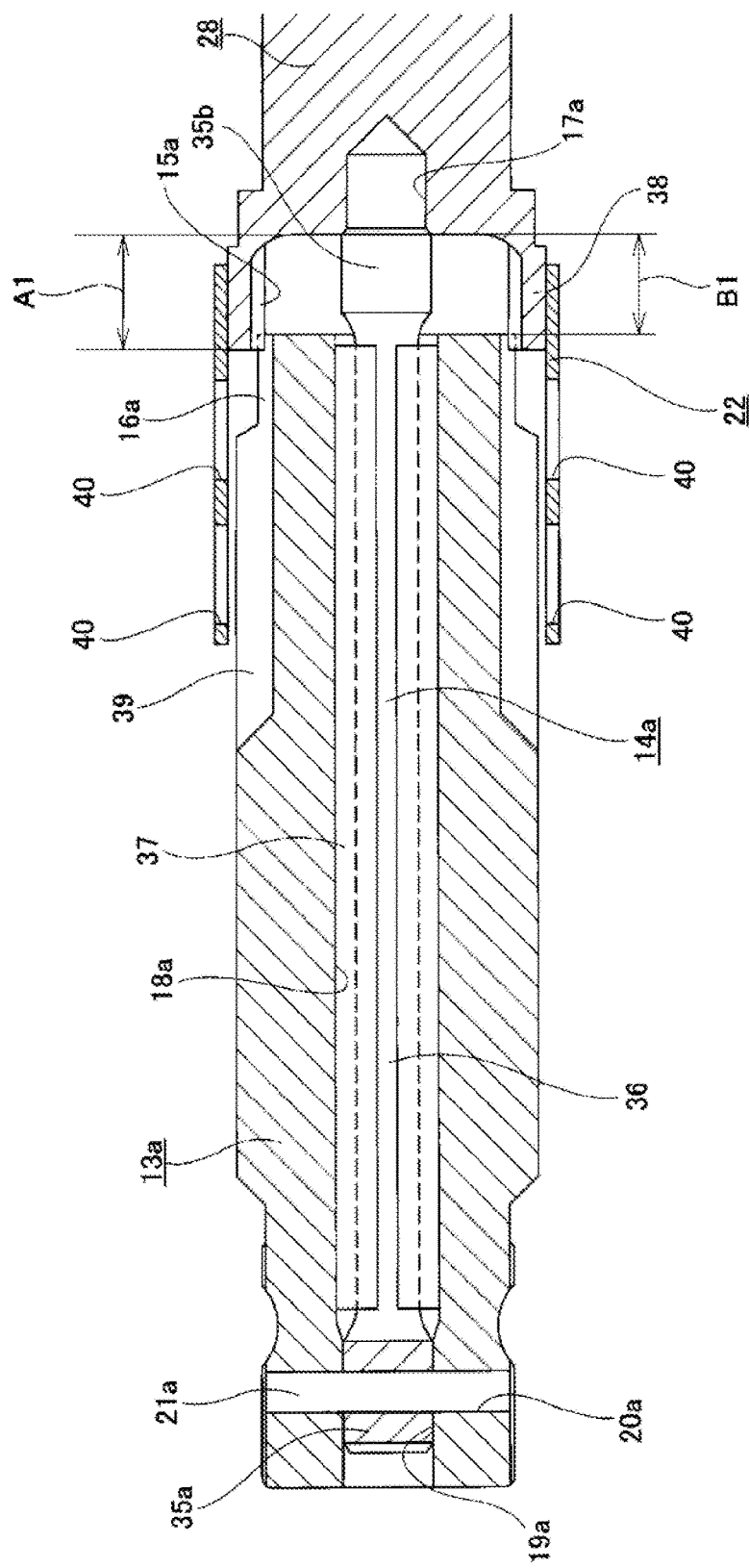
FIG. 5 is a sectional view showing a stage of the assembling of respective components subsequent to FIG. 4.
Figure 6:
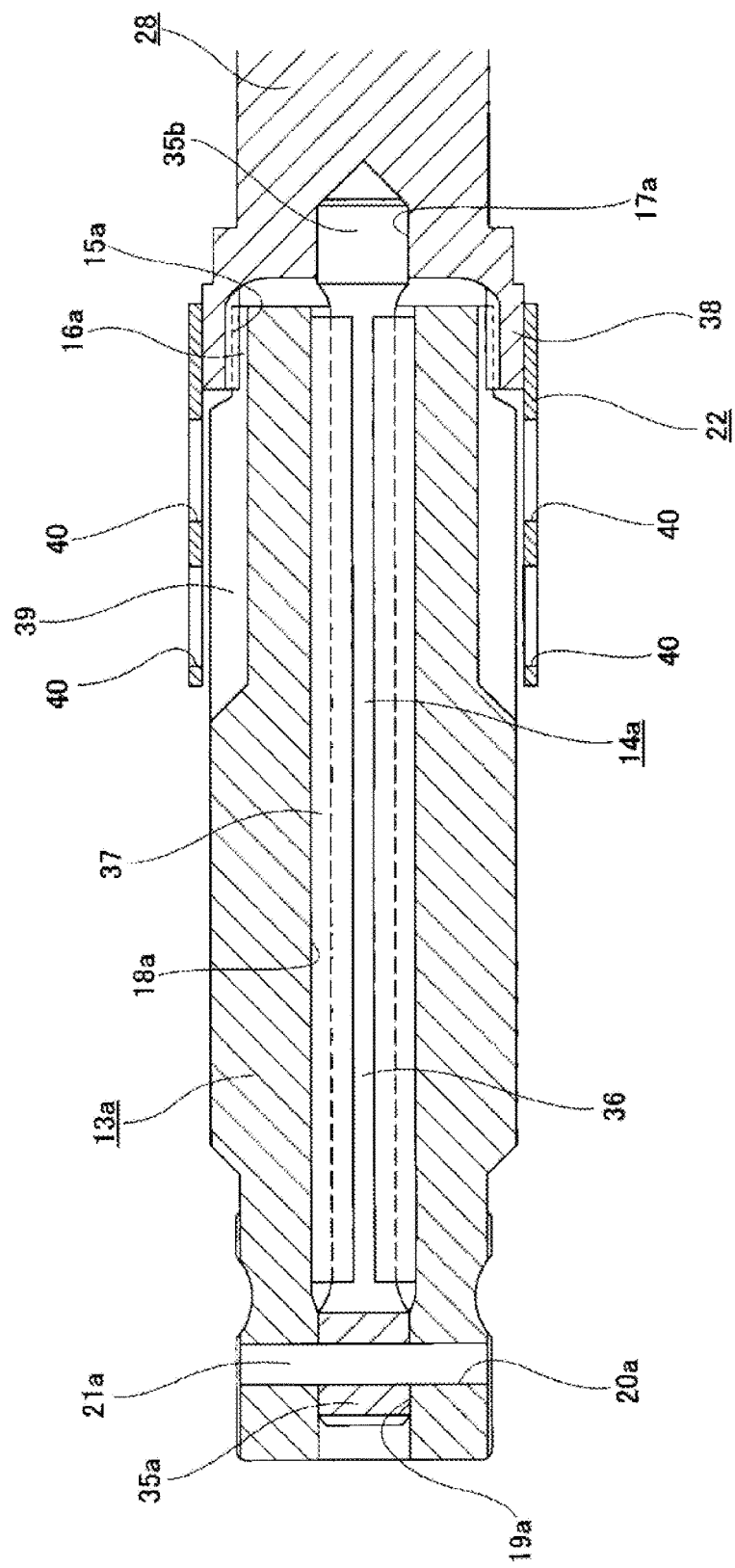
FIG. 6 is a sectional view showing a state after completion of the assembling of respective components.

Then, as shown in order of FIG. 4 and FIG. 5, the rear end portion of the male stopper portion 16a, which is provided on the outer peripheral surface of the rear end portion of the output shaft 13a, and the front end portion of the female stopper portion 15a, which is provided on the inner peripheral surface of the cylindrical portion 38 of the lower shaft 28, are engaged with each other with the circumferential gap being interposed, and a rear end edge portion of the rear-side coupling shaft portion 35b of the torsion bar 14a is engaged into the opening of the coupling hole 17a of the lower shaft 28. In the meantime, according to the first embodiment, in order to engage the rear end portion of the male stopper portion 16a and the front end portion of the female stopper portion 15a each other with the circumferential gap therebetween before press-fitting the coupling shaft portion 35b into the coupling hole 17a, an axial size A1 from the opening of the coupling hole 17a to a front end edge of the female stopper portion 15a at the state shown in FIGS. 4 and 5 is set to be slightly greater than an axial size B1 (a protruding amount of the coupling shaft portion 35b from the rear end opening of the center hole 18a of the output shaft 13a) from a rear end edge of the male stopper portion 16a to the rear end edge portion of the coupling shaft portion 35b (A1>B1).

Then, at the state shown in FIG. 5, the engaged state between the male and female stopper portions 16a, 15a is made to be neutral in the circumferential direction, so that a positional relation between the lower shaft 28 and the output shaft 13a in the rotating direction is adjusted to a center position of a predetermined angle range. Then, at this state, as shown in order of FIG. 5 and FIG. 6, the coupling shaft portion 35b is press-fitted into the coupling hole 17a. Thereby, the coupling shaft portion 35b is coupled to the lower shaft 28 such that torque can be transmitted. In the meantime, in the first embodiment, when press-fitting the coupling shaft portion 35b into the coupling hole 17a, the axially reactive force to be applied to the torsion bar 14a can be sufficiently supported by the pin 21a.

In the meantime, when implementing the structure of the first embodiment, the other constitutional members may be assembled to the respective constitutional members shown in FIGS. 3 to 6 in appropriate order. That is, the specific assembling order is not particularly limited.

According to the electric power steering device configured as described above, when a driver operates the steering wheel 1 and torque, which is a steering force, is thus applied to the steering shaft 3a, the torsion bar 14a is elastically distorted (within a predetermined angle range) in correspondence to a direction and a magnitude of the torque. Accordingly, the circumferential positional relation of the torque detection concavo-convex portion 39 and the torque detection sleeve 22 is changed, so that impedance is changed in the coils 41, 41 configuring the torque detection coil unit 23. For this reason, based on the impedance change, it is possible to detect the direction and magnitude of the torque. The electric motor 10 generates auxiliary power corresponding to the direction and magnitude of the torque. The auxiliary power is increased by the worm-type decelerator 24 and is then applied to the output shaft 13a. As a result, the force which is necessary for the driver to operate the steering wheel 1 is reduced.

In the meantime, when the distortion amount of the spring shaft portion 36 of the torsion bar 14a reaches an upper limit of one or other side of the predetermined angle range as the high torque is input from the steering wheel 1 to the steering shaft 3a, the female stopper portion 15a and the male stopper portion 16a are circumferentially meshed. Based on the meshing, a portion of the torque is directly transmitted from the lower shaft 28 to the output shaft 13a. That is, even when the high torque is input from the steering wheel 1 to the steering shaft 3a, the excessive distortion is prevented from being generated in the spring shaft portion 36.

According to the electric power steering device and the method for assembling the same of the first embodiment as described above, as shown in order of FIG. 5 and FIG. 6, when press-fitting the coupling shaft portion 35b, which is to be later coupled to the counter-shaft (the lower shaft 28, the output shaft 13a), of the pair of coupling shaft portions 35a, 35b, which are both axial end portions of the torsion bar 14a, into the coupling hole 17a of the counter-shaft (the lower shaft 28), it is possible to prevent the spring shaft portion 36 of the torsion bar 14a from buckling. That is, according to the first embodiment, when press-fitting the coupling shaft portion 35b into the coupling hole 17a, the axially high compressive force is applied to the spring shaft portion 36. However, even though the spring shaft portion 36 tends to buckle due to the axially high compressive force, the outer peripheral surface of the spring shaft portion 36 is in contact with it to contact the inner peripheral surface of the output shaft 13a via the buckling prevention member 37, so that the buckling deformation is prevented.

In the meantime, the buckling deformation of the spring shaft portion 36 is deformation which the spring shaft portion 36 is bent into an arch shape. In contrast, according to the first embodiment, the buckling prevention member 37 is fitted and supported on the portion including the axially center portion (a portion of which a diametrical displacement amount is greatest when the spring shaft portion 36 is buckling-deformed) of the outer peripheral surface of the spring shaft portion 36. For this reason, when press-fitting the coupling shaft portion 35b into the coupling hole 17a, it is possible to sufficiently suppress the diametrical displacement of the axially center portion of the spring shaft portion 36 by the buckling prevention member 37. Therefore, it is possible to efficiently prevent the buckling deformation of the spring shaft portion 36.

Also, according to the first embodiment, since it is possible to prevent the buckling deformation of the spring shaft portion 36 as described above, it is possible to easily lower the stiffness of the torsion bar 14a so as to reduce the vibrations to be transmitted from the steered wheels to the steering wheel and to improve the detection sensitivity of the steering torque.

Also, according to the first embodiment, at the assembling, as shown in FIG. 5, since it is possible to engage the axial end portions of the male and female stopper portions 16a, 15a before press-fitting the coupling shaft portion 35b into the coupling hole 17a, the positional relation between the lower shaft 28 and the output shaft 13a in the rotating direction can be easily adjusted to the center position of the predetermined angle range. Therefore, it is possible to easily realize the normal assembled state.

In the meantime, when implementing the structure of the first embodiment, in order to sufficiently prevent the buckling of the spring shaft portion 36 even at a portion of the buckling prevention member 37, which corresponds to the cut-out in the circumferential direction, the width of the cut-out of the buckling prevention member 37 is preferably made as small as possible when the buckling prevention member 37 is fitted and supported on the outer peripheral surface of the spring shaft portion 36.

Second Embodiment

Figure 7:
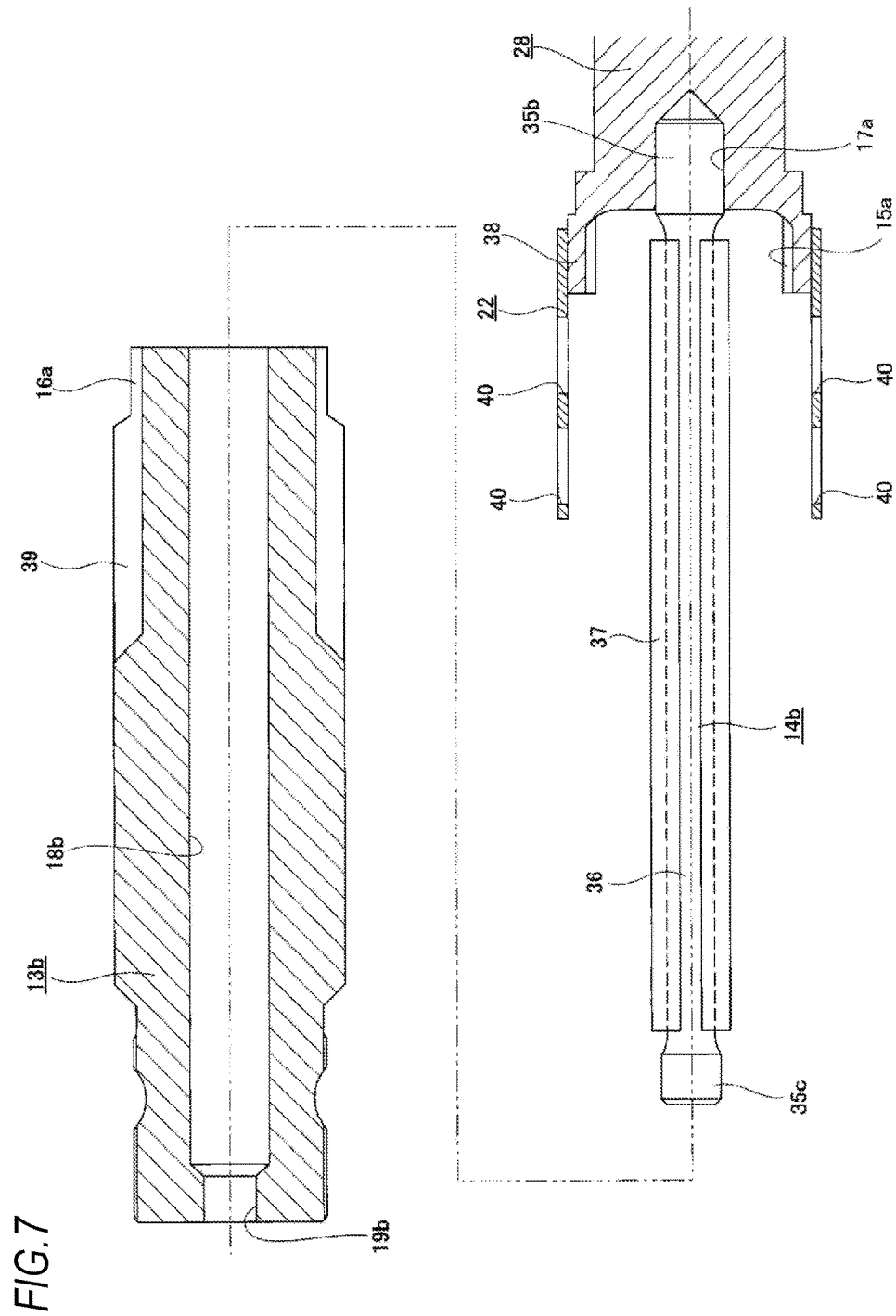
FIG. 7 is a sectional view showing a stage of assembling some components such as an input shaft, an output shaft, a torsion bar, a buckling prevention member and the like in a structure of a second embodiment of the present invention.
Figure 8:
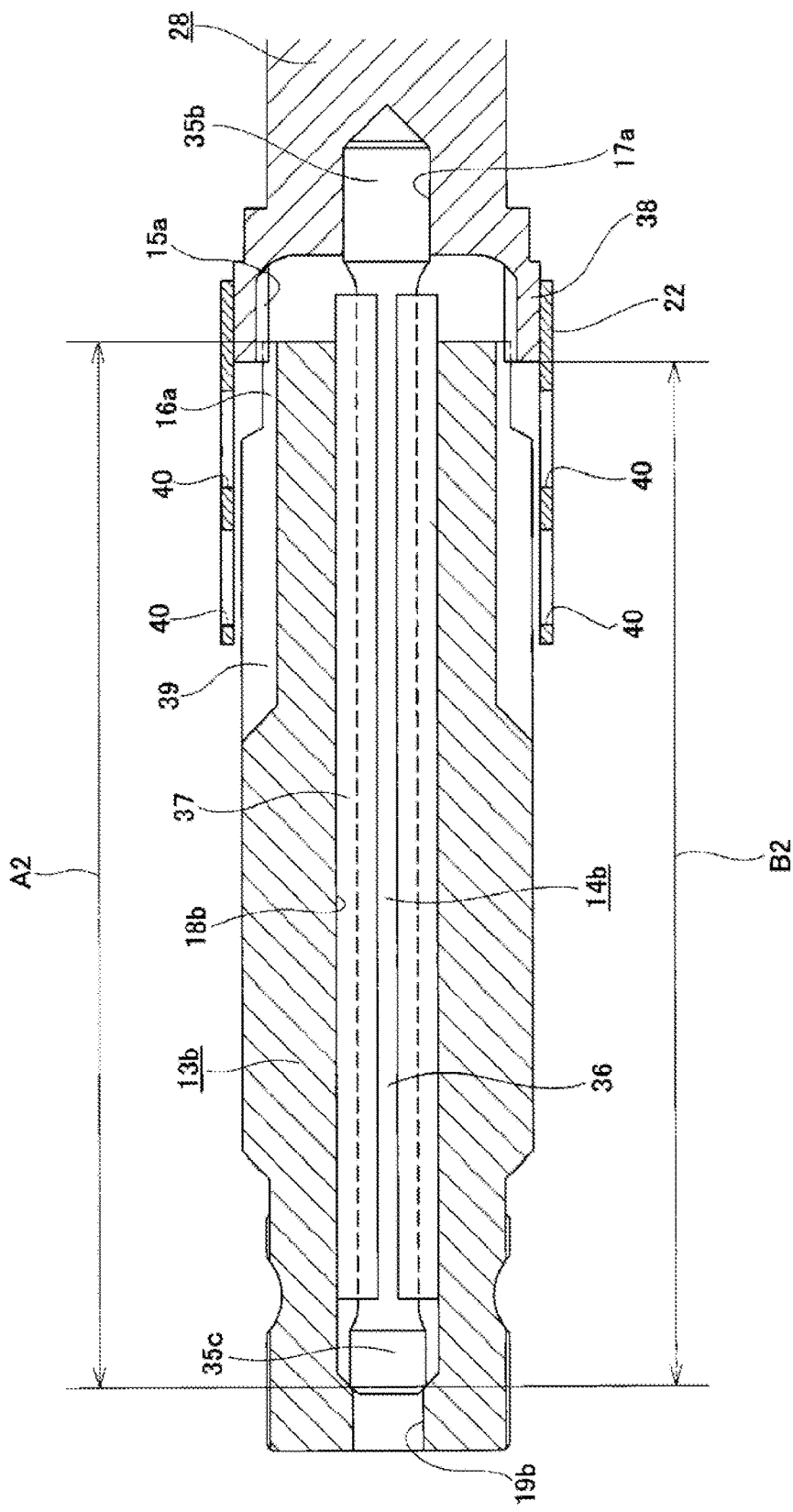
FIG. 8 is a sectional view showing a stage of the assembling of respective components subsequent to FIG. 7.
Figure 9:
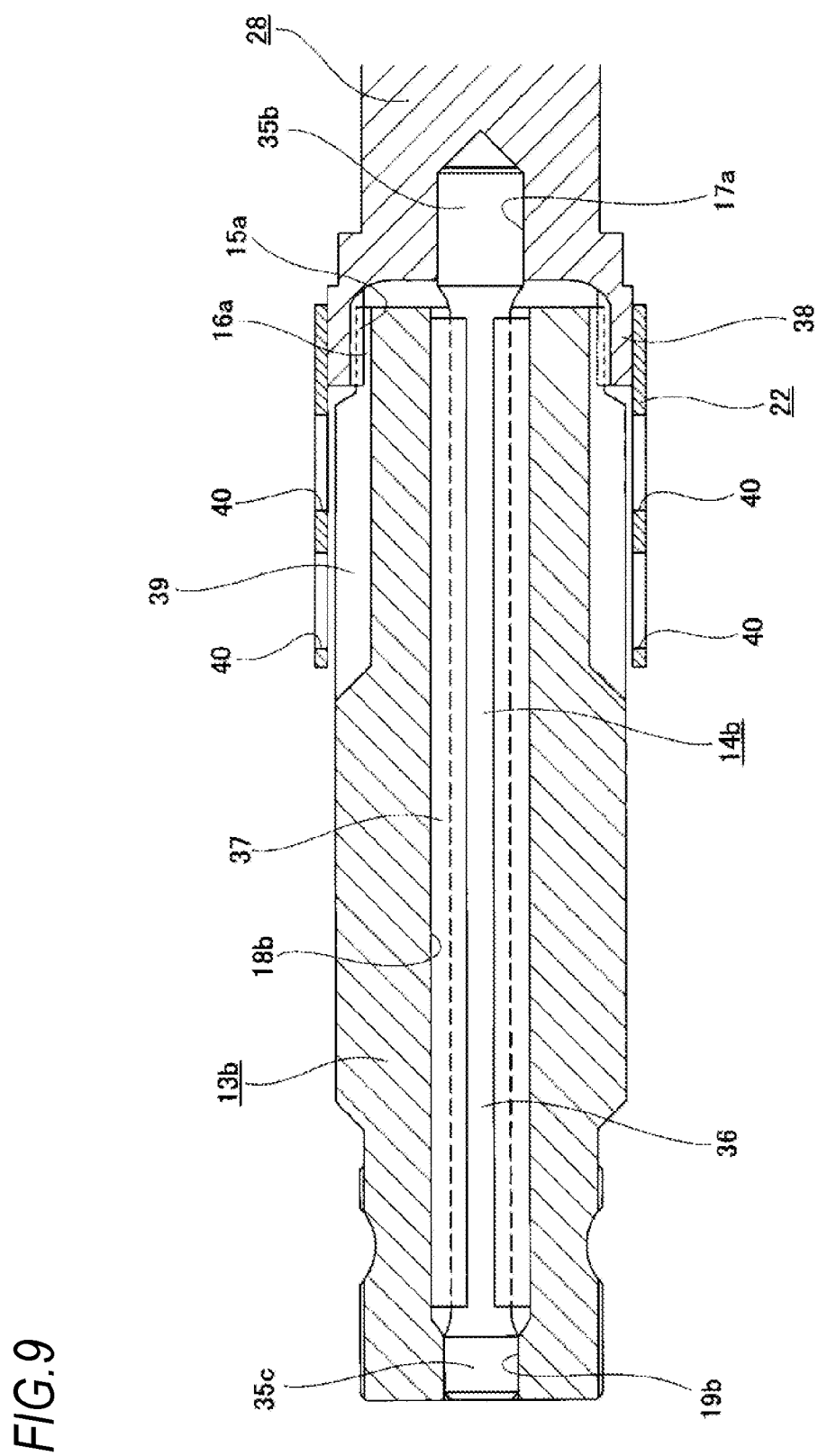
FIG. 9 is a sectional view showing a state after completion of the assembling of respective components.

A second embodiment of the present invention is described with reference to FIGS. 7 to 9. In FIGS. 7 to 9, the left side is a front side and the right side is a rear side.

In the second embodiment, as shown in FIG. 9, a structure for coupling a front-side coupling shaft portion 35c of a torsion bar 14b to an output shaft 13b such that torque can be transmitted is different from the first embodiment. That is, according to the second embodiment, in order to couple the coupling shaft portion 35c to the output shaft 13b such that torque can be transmitted, the coupling shaft portion 35c is press-fitted into a coupling hole 19b formed in a front end portion of a center hole 18b of the output shaft 13b. Thereby, male serration subject to hardening processing such as quenching and provided on an outer peripheral surface of the coupling shaft portion 35c is mechanically bitten to a cylindrical inner peripheral surface of the coupling hole 19b for which the hardening processing is not performed.

Also, in the second embodiment, when assembling the lower shaft 28, the output shaft 13b, the torsion bar 14b and the buckling prevention member 37, the buckling prevention member 37 is first fitted and supported on the spring shaft portion 36 of the torsion bar 14b, as shown in the lower half part of FIG. 7. This operation can be easily performed in the same manner as the first embodiment. Also, the rear-side coupling shaft portion 35b of the torsion bar 14b is first press-fitted into the bottomed coupling hole 17a of the lower shaft 28 and abuts on a bottom end portion of the coupling hole 17a. Thereby, like the first embodiment, the coupling shaft portion 35b is coupled to the lower shaft 28 such that torque can be transmitted. Also, the base end portion of the torque detection sleeve 22 is fitted and fixed on the cylindrical portion 38 of the lower shaft 28.

Then, as shown in order of FIG. 7 and FIG. 8, the torsion bar 14b is inserted into the inner diameter side of the output shaft 13b, and the front end edge portion of the front-side coupling shaft portion 35c of the torsion bar 14b is engaged with the rear end opening of the coupling hole 19b of the output shaft 13b. The rear end portion of the male stopper portion 16a provided on the outer peripheral surface of the rear end portion of the output shaft 13b and the front end portion of the female stopper portion 15a provided on the inner peripheral surface of the cylindrical portion 38 of the lower shaft 28 are engaged with the circumferential gap therebetween. In the meantime, according to the second embodiment, in order to engage the rear end portion of the male stopper portion 16a and the front end portion of the female stopper portion 15a each other with the circumferential gap therebetween before press-fitting the coupling shaft portion 35c into the coupling hole 19b in this manner, an axial size A2 from the rear end opening of the coupling hole 19b to the rear end edge of the male stopper portion 16a at the state shown in FIGS. 7 and 8 is set to be slightly greater than an axial size B2 from the front end edge of the female stopper portion 15a to the front end edge portion of the coupling shaft portion 35c (A2>B2).

Then, at the state shown in FIG. 8, the engaged state between the male and female stopper portions 16a, 15a is made to be neutral in the circumferential direction, so that a positional relation between the lower shaft 28 and the output shaft 13b in the rotating direction is adjusted to a center position of a predetermined angle range within which the relative rotations of the lower shaft 28 and the output shaft 13b can be made. Then, at this state, as shown in order of FIG. 8 and FIG. 9, the coupling shaft portion 35c is press-fitted into the coupling hole 19b. Thereby, the coupling shaft portion 35c is coupled to the output shaft 13b such that torque can be transmitted. In the meantime, according to the second embodiment, when press-fitting the coupling shaft portion 35c into the coupling hole 19b, the axially reactive force to be applied to the torsion bar 14a can be sufficiently supported by the bottom end portion of the coupling hole 17a of the output shaft 13b.

According to the electric power steering device and the method for assembling the same of the second embodiment as described above, as shown in order of FIG. 8 and FIG. 9, when press-fitting the coupling shaft portion 35c, which is to be later coupled to the counter-shaft (the lower shaft 28, the output shaft 13b), of the pair of coupling shaft portions 35c, 35b, which are both axial end portions of the torsion bar 14b, into the coupling hole 19b of the counter-shaft (the output shaft 13b), it is possible to prevent the spring shaft portion 36 of the torsion bar 14b from buckling. That is, according to the second embodiment, when press-fitting the coupling shaft portion 35c into the coupling hole 19b, the axially high compressive force is applied to the spring shaft portion 36. However, even though the spring shaft portion 36 tends to buckle due to the axially high compressive force, the outer peripheral surface of the spring shaft portion 36 is in contact with or is to contact the inner peripheral surface of the output shaft 13a via the buckling prevention member 37, so that the buckling deformation is prevented.

Also, according to the second embodiment, at the assembling, as shown in FIG. 8, since it is possible to engage the axial end portions of the male and female stopper portions 16a, 15a before press-fitting the coupling shaft portion 35c into the coupling hole 19b, the positional relation between the lower shaft 28 and the output shaft 13b in the rotating direction can be easily adjusted to the center position of the predetermined angle range. Therefore, it is possible to easily realize the normal assembled state.

In the meantime, when implementing the structure of the second embodiment, the coupling shaft portion 35c and the output shaft 13b may be coupled and fixed by welding after press-fitting the front-side coupling shaft portion 35c into the coupling hole 19b of the output shaft 13b.

Since the other configurations and operations are the same as the first embodiment, the overlapping illustrations and descriptions are omitted.

Third Embodiment

Figure 10:
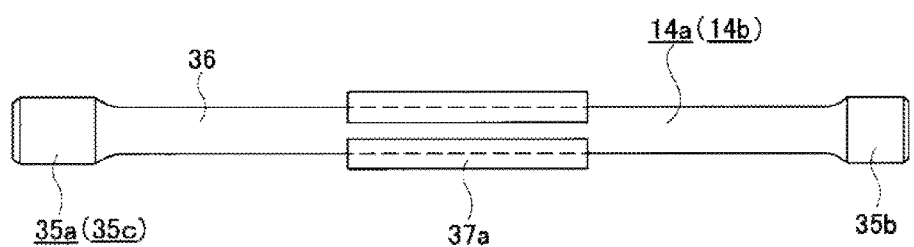
FIG. 10 is a side view of a torsion bar and a buckling prevention member of a third embodiment.

FIG. 10 shows a third embodiment of the present invention. In the third embodiment, an axial size of a buckling prevention member 37a which is fitted and supported on the outer peripheral surface of the spring shaft portion 36 of the torsion bar 14a (or 14b) is shorter than the first and second embodiments (a length of about ⅓). The buckling prevention member 37a is fixed to the outer peripheral surface of the spring shaft portion 36 by an adhesive with being fitted on the axially center portion of the outer peripheral surface of the spring shaft portion 36. Thereby, at the assembling, the buckling prevention member 37a is prevented from being axially displaced with respect to the spring shaft portion 36.

Also, in the third embodiment having the above configuration, when press-fitting the coupling shaft portion, which is to be later coupled to the counter-shaft, of the pair of coupling shaft portions 35a (or 35c), 35b, which are both axial end portions of the torsion bar 14a (or 14b), into the coupling hole of the counter-shaft, it is possible to sufficiently suppress the diametrical displacement of the axially center portion of the spring shaft portion 36 by the buckling prevention member 37a. Therefore, it is possible to efficiently prevent the buckling deformation of the spring shaft portion 36.

Since the other configurations and operations are the same as the first or second embodiment, the overlapping illustrations and descriptions are omitted.

Fourth Embodiment

Figure 11:
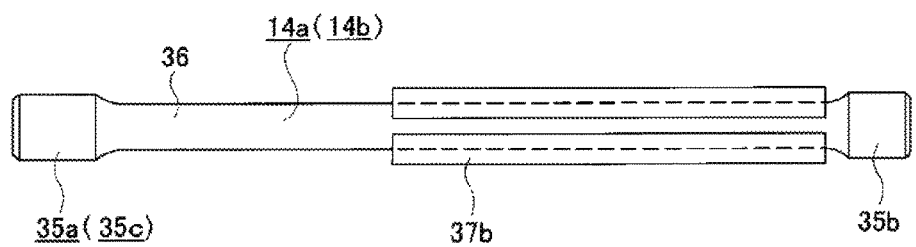
FIG. 11 is a similar view to FIG. 10, showing a fourth embodiment of the present invention.

FIG. 11 shows a fourth embodiment of the present invention. In the fourth embodiment, an axial size of a buckling prevention member 37b which is fitted and supported on the outer peripheral surface of the spring shaft portion 36 of the torsion bar 14a (or 14b) is (slightly) greater than a half of the axial size of the spring shaft portion 36. Thereby, even when the buckling prevention member 37b is displaced to any axial position on the outer diameter side of the spring shaft portion 36, some axial portion of the buckling prevention member 37b is always positioned at the outer diameter side of the axially center portion of the outer peripheral surface of the spring shaft portion 36.

Also in the fourth embodiment having the above configuration, when press-fitting the coupling shaft portion, which is to be later coupled to the counter-shaft, of the pair of coupling shaft portions 35a (or 35c), 35b, which are both axial end portions of the torsion bar 14a (or 14b), into the coupling hole of the counter-shaft, it is possible to sufficiently suppress the diametrical displacement of the axially center portion of the spring shaft portion 36 by the buckling prevention member 37b. Therefore, it is possible to efficiently prevent the buckling deformation of the spring shaft portion 36.

Since the other configurations and operations are the same as the first or second embodiment, the overlapping illustrations and descriptions are omitted.

Fifth Embodiment

Figure 12:
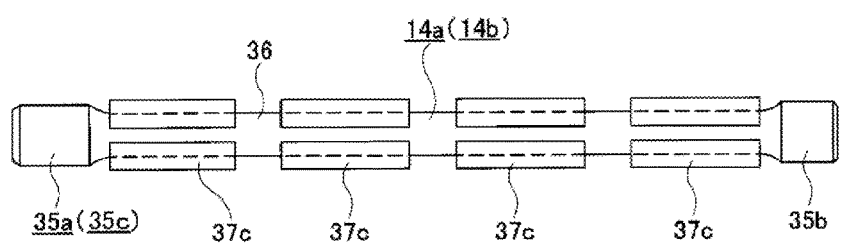
FIG. 12 is a similar view to FIG. 10, showing a fifth embodiment of the present invention.

FIG. 12 shows a fifth embodiment of the present invention. In the fifth embodiment, a plurality of (four, in the shown example) buckling prevention members 37c, 37c of which an axial size is short is fitted and supported side by side in the axial direction on the outer peripheral surface of the spring shaft portion 36 of the torsion bar 14a (or 14b).

When implementing the structure of the fifth embodiment, the number of the buckling prevention members 37c, 37c is not particularly limited. Also, axial sizes of the buckling prevention members 37c, 37c may be different from each other. Also, each of the buckling prevention members 37c, 37c may be provided on the outer peripheral surface of the spring shaft portion 36 to be relatively displaceable in the axial direction, or may be fixed thereto by an adhesive and the like. Also, when implementing the present invention, it is possible to achieve the object of the present invention (the effect of preventing the buckling of the spring shaft portion) to some extent simply by fitting and supporting only the one buckling prevention member 37c having the short axial size on the outer peripheral surface of the spring shaft portion 36 to be relatively displaceable in the axial direction.

Since the other configurations and operations are the same as the first or second embodiment, the overlapping illustrations and descriptions are omitted.

Sixth Embodiment

Figure 13:
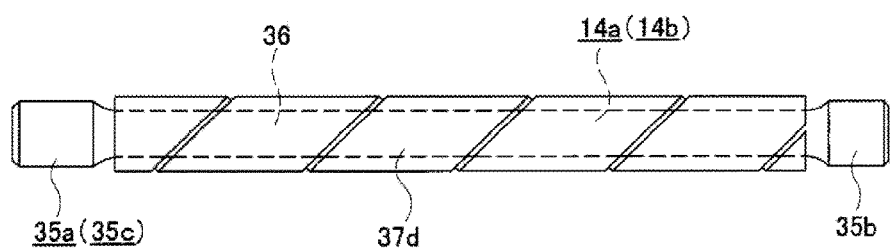
FIG. 13 is a similar same view to FIG. 10, showing a sixth embodiment of the present invention.

FIG. 13 shows a sixth embodiment of the present invention. In the sixth embodiment, a cut-out provided for a buckling prevention member 37d which is fitted and supported on the outer peripheral surface of the spring shaft portion 36 of the torsion bar 14a (or 14b) is inclined (is spiral) with respect to a center axis of the buckling prevention member 37d. Thereby, the buckling prevention member 37d is configured like a spiral tube having a tube shape formed by winding a band-shaped material into a spiral shape. In the sixth embodiment, the buckling prevention member 37d has a structure where an inner diameter size can be increased/decreased by the cut-out and also has a shape where it is closed over an entire circumference thereof. Therefore, it is possible to sufficiently prevent the buckling of the spring shaft portion 36 at any position in the circumferential direction.

When implementing the present invention, even when the buckling prevention member has the spiral tube configuration, like the sixth embodiment, it is possible to adopt the arrangement configuration as shown in FIGS. 10 to 12 for the buckling prevention member.

Since the other configurations and operations are the same as the first or second embodiment, the overlapping illustrations and descriptions are omitted.

Seventh Embodiment

FIG. 14 shows a seventh embodiment of the present invention. In the seventh embodiment, a buckling prevention member 37e which is fitted and supported on the outer peripheral surface of the spring shaft portion 36 of the torsion bar 14a (or 14b) is configured by a cylindrical heat-shrinkable tube having no cut-out over an entire circumference thereof. That is, in the seventh embodiment, when fitting and supporting buckling prevention member 37e on the outer peripheral surface of the spring shaft portion 36, the cylindrical buckling prevention member 37e before thermal shrinkage of which an inner diameter size is greater than the outer diameter sizes of the pair of coupling shaft portions 35a (or 35c), 35b, which are both axial end portions of the torsion bar 14a (or 14b), is first prepared and the spring shaft portion 36 of the torsion bar 14a (or 14b) is inserted into an inner diameter side of the buckling prevention member 37e, as shown in FIGS. 14A and 14B. Then, at this state, the buckling prevention member 37e is heated and thus shrunk, so that an inner peripheral surface of the buckling prevention member 37e is closely contacted to the outer peripheral surface of the spring shaft portion 36 and the buckling prevention member 37e is thus fitted and supported on the outer peripheral surface of the spring shaft portion 36, as shown in FIGS. 14C and 14D. In the meantime, as the material of the buckling prevention member 37e of the seventh embodiment, which is a heat-shrinkable tube, polyolefin, fluorine-based polymer, thermoplastic elastomer and the like may be mainly used.

In the meantime, when implementing the present invention, even when the buckling prevention member is configured by the heat-shrinkable tube, like the seventh embodiment, it is possible to adopt the arrangement configuration as shown in FIGS. 10 to 12 for the buckling prevention member.

Since the other configurations and operations are the same as the first or second embodiment, the overlapping illustrations and descriptions are omitted.

Eighth Embodiment

FIG. 15 shows an eighth embodiment. In the eighth embodiment, a buckling prevention member 37f which is fitted and fixed on the outer peripheral surface of the spring shaft portion 36 of the torsion bar 14a (or 14b) is configured by a cylindrical synthetic resin member having no cut-out over an entire circumference thereof. Particularly, in the eighth embodiment, the buckling prevention member 37f is fitted and fixed or coupled and fixed to the outer peripheral surface of the spring shaft portion 36 by injection-molding the buckling prevention member 37f on the outer diameter side of the spring shaft portion 36.

Since the other configurations and operations are the same as the first or second embodiment, the overlapping illustrations and descriptions are omitted.

Ninth Embodiment

Figure 16:
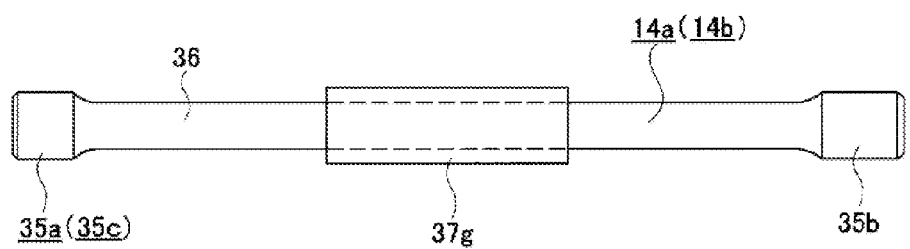
FIG. 16 is a similar view to FIG. 10, showing a ninth embodiment of the present invention.

FIG. 16 shows a ninth embodiment. In the ninth embodiment, a buckling prevention member 37g which is fitted and fixed on the outer peripheral surface of the spring shaft portion 36 of the torsion bar 14a (or 14b) is arranged only at the axially center portion.

The other configurations and operations are the same as the eighth embodiment.

Tenth Embodiment

Figure 17:
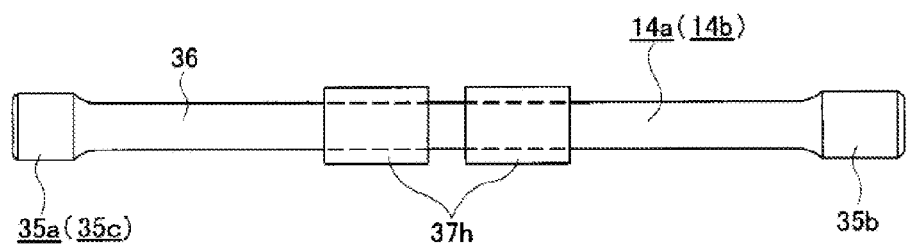
FIG. 17 is a similar view to FIG. 10, showing a tenth embodiment of the present invention.

FIG. 17 shows a tenth embodiment. In the tenth embodiment, buckling prevention members 37h, 37h which are fitted and fixed on the outer peripheral surface of the spring shaft portion 36 of the torsion bar 14a (or 14b) are arranged only at two positions close to the axially center portion.

The other configurations and operations are the same as the eighth embodiment.

Eleventh Embodiment

FIG. 18 shows an eleventh embodiment. In the eleventh embodiment, buckling prevention members 37i, 37i, each of which has an axially long band shape, are coupled and fixed to four positions at a circumferentially equal distance on the outer peripheral surface of the spring shaft portion 36 of the torsion bar 14a (or 14b). In the eleventh embodiment, the molding of the respective buckling prevention members 37i, 37i and the coupling and fixing thereof to the outer peripheral surface of the spring shaft portion 36 are performed at the same time by injection-molding the respective buckling prevention members 37i, 37i on the outer diameter side of the spring shaft portion 36. According to the eleventh embodiment having the above configuration, it is possible to reduce the weight of the buckling prevention member, as compared to the configuration where a cylindrical member of which entire circumference is continuous is adopted as the buckling prevention member.

In the meantime, when implementing the present invention, even when the buckling prevention members are coupled and fixed to the plurality of circumferential positions on the outer peripheral surface of the spring shaft portion, like the eleventh embodiment, it is possible to adopt the arrangement configuration as shown in FIGS. 16 and 17 for each buckling prevention member.

Since the other configurations and operations are the same as the first or second embodiment, the overlapping illustrations and descriptions are omitted.

Twelfth Embodiment

FIG. 19 shows a twelfth embodiment. In the twelfth embodiment, a buckling prevention member 37j which is to be fitted and supported or coupled and fixed on the outer peripheral surface of the spring shaft portion 36 of the torsion bar 14a (or 14b) is configured by a cylindrical rubber member having no cut-out over an entire circumference thereof. Particularly, in the twelfth embodiment, while the buckling prevention member 37j is molded on the outer diameter side of the spring shaft portion 36, the buckling prevention member 37j is simultaneously vulcanization-bonded to the outer peripheral surface of the spring shaft portion 36.

In the meantime, when implementing the present invention, when the configuration where the buckling prevention member made of rubber is vulcanization-bonded to the outer peripheral surface of the spring shaft portion, like the twelfth embodiment, it is possible to adopt the arrangement configuration as shown in FIGS. 16 to 18 for the buckling prevention member.

Since the other configurations and operations are the same as the first or second embodiment, the overlapping illustrations and descriptions are omitted.

Also, when implementing the present invention, it is preferable to adopt a structure capable of easily enabling the press-fitting at the press-fitting of the coupling shaft portion of the torsion bar into the coupling hole of the counter-shaft. FIGS. 20 to 23 show four examples of the structure capable of easily enabling the press-fitting.

Figure 20:
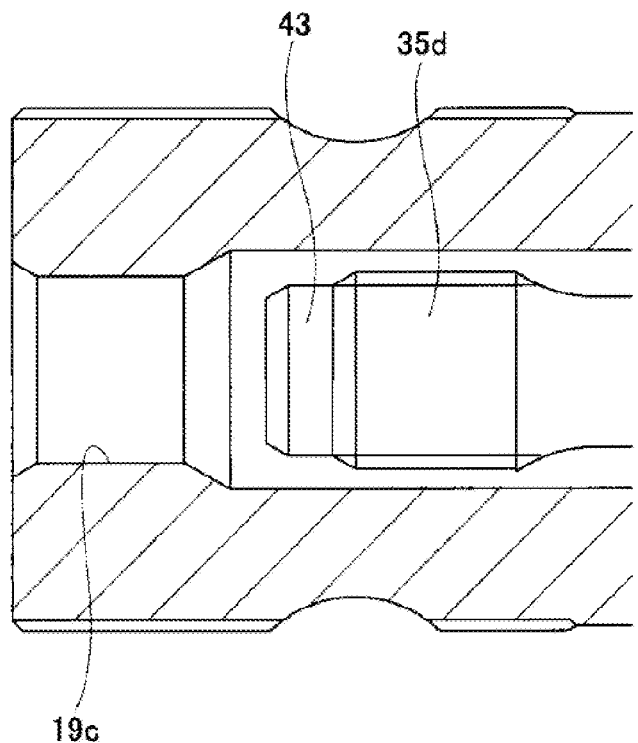
FIG. 20 is a sectional view of a main portion showing a first example of a structure capable of enabling an easy operation of press-fitting a coupling shaft portion into a coupling hole.

In the example of FIG. 20, a guide shaft portion 43 arranged concentrically with a coupling shaft portion 35d and having a diameter smaller than the coupling shaft portion 35d is provided at a portion adjacent to a tip-side (left side in FIG. 20) of the coupling shaft portion 35d. An outer peripheral surface of the guide shaft portion 43 is cylindrical except for a chamfered tip portion thereof. The guide shaft portion 43 is inserted into a coupling hole 19c without an interference, so that the coupling shaft portion 35d is aligned with respect to the coupling hole 19c. Thereby, the press-fitting of the coupling shaft portion 35d into the coupling hole 19c can be guided.

On the other hand, in the example of FIG. 20, the outer peripheral surface of the guide shaft portion 43 may be made to have a tapered shape as a whole such that a diameter size thereof decreases (tapers) as proceeding towards a left side of FIG. 20.

Figure 21:
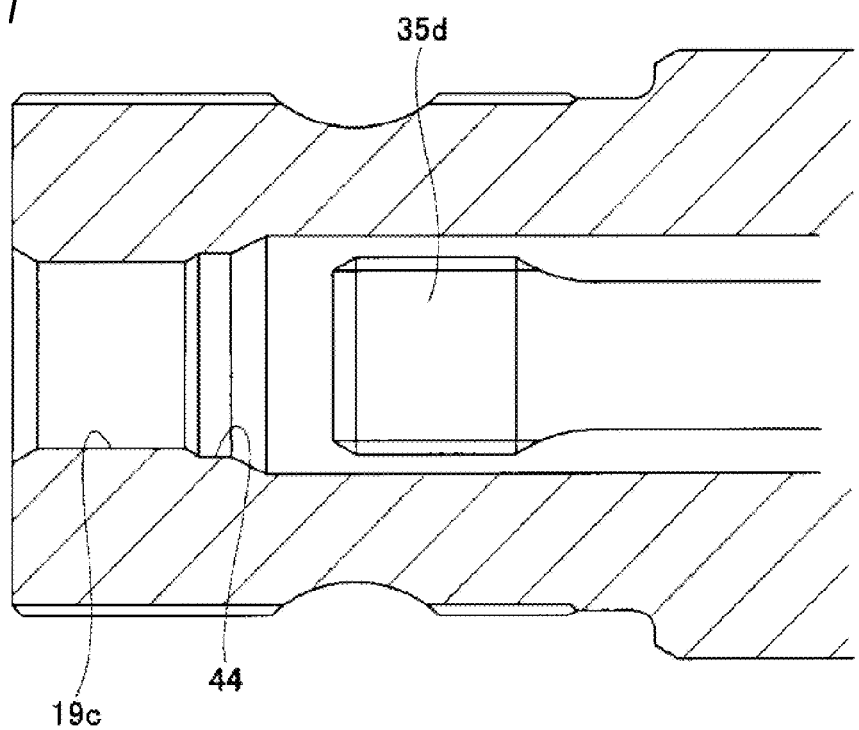
FIG. 21 is a sectional view of a main portion showing a second example of the structure capable of enabling an easy operation of press-fitting the coupling shaft portion into the coupling hole.

Also, in the example of FIG. 21, a guide hole 44 arranged concentrically with the coupling hole 19c and having a diameter greater than the coupling hole 19c is provided at a portion adjacent to an entrance-side (right side in FIG. 21)

of the coupling hole 19c. An inner peripheral surface of the guide hole 44 is cylindrical except for a portion continuing to the coupling hole 19c. The tip portion of the coupling shaft portion 35d is inserted into the guide hole 44 without an interference, so that the coupling shaft portion 35d is aligned with respect to the coupling hole 19c. Thereby, the press-fitting of the coupling shaft portion 35d into the coupling hole 19c can be guided.

Figure 22:
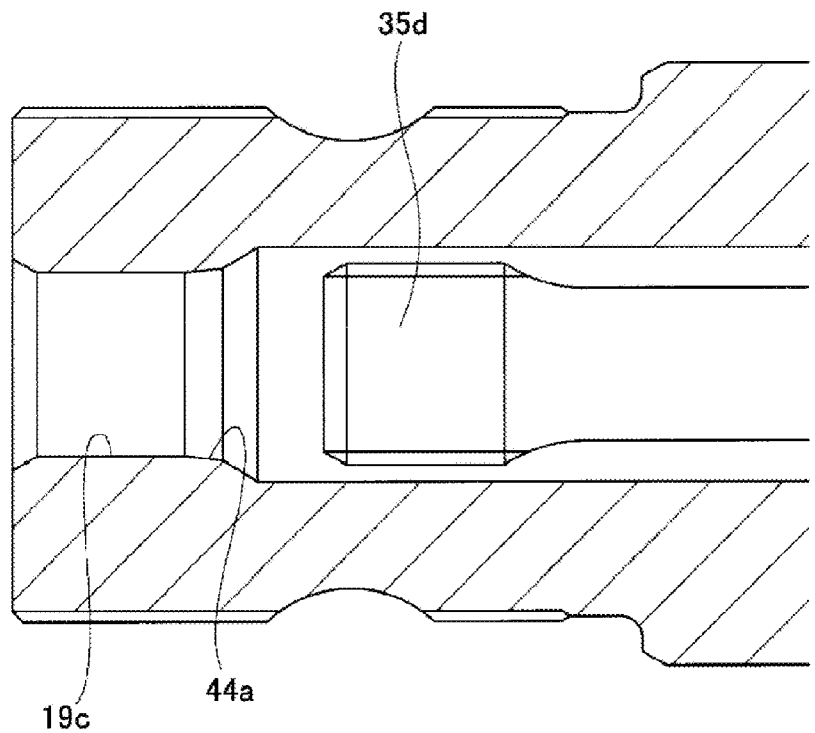
FIG. 22 is a sectional view of a main portion showing a third example of the structure capable of enabling an easy operation of press-fitting the coupling shaft portion into the coupling hole.

Also, in the example of FIG. 22, an inner peripheral surface of a guide hole 44a provided at the portion adjacent to the entrance-side (right side in FIG. 22) of the coupling hole 19c is made to have a tapered shape of which a diameter size decreases as proceeding towards a left side of FIG. 22 (a diameter size increase as proceeding towards a direction separating away from the coupling hole 19c in the axial direction).

Figure 23:
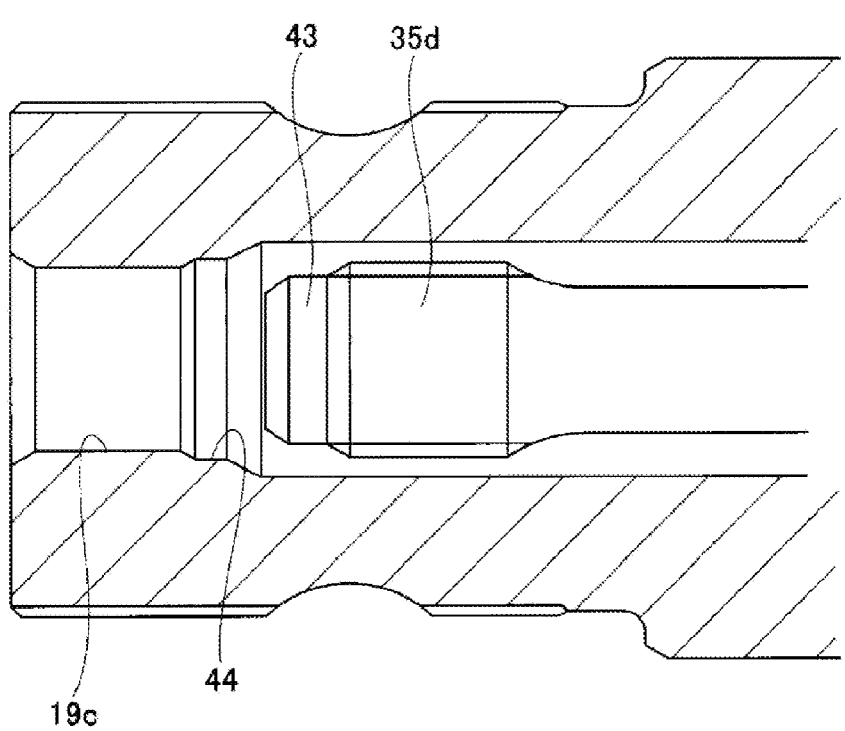
FIG. 23 is a sectional view of a main portion showing a fourth example of the structure capable of enabling an easy operation of press-fitting the coupling shaft portion into the coupling hole.

Also, the example of FIG. 23 shows a configuration where both the guide shaft portion 43 described in FIG. 20 and the guide hole 44 described in FIG. 21 are provided.

Meanwhile, in the example of FIG. 23, at least one of the outer peripheral surface of the guide shaft portion 43 and the inner peripheral surface of the guide hole 44 may be made to have a tapered shape as a whole such that a diameter size thereof decreases as proceeding towards a left side of FIG. 23.

In the meantime, when the guide shaft portion and/or the guide hole is provided, like the examples of FIGS. 20 to 23, the engaged state between the male and female stopper portions 16a, 15a can be easily made to be neutral in the circumferential direction with one being engaged with the other.

Thirteenth Embodiment

Figure 24:
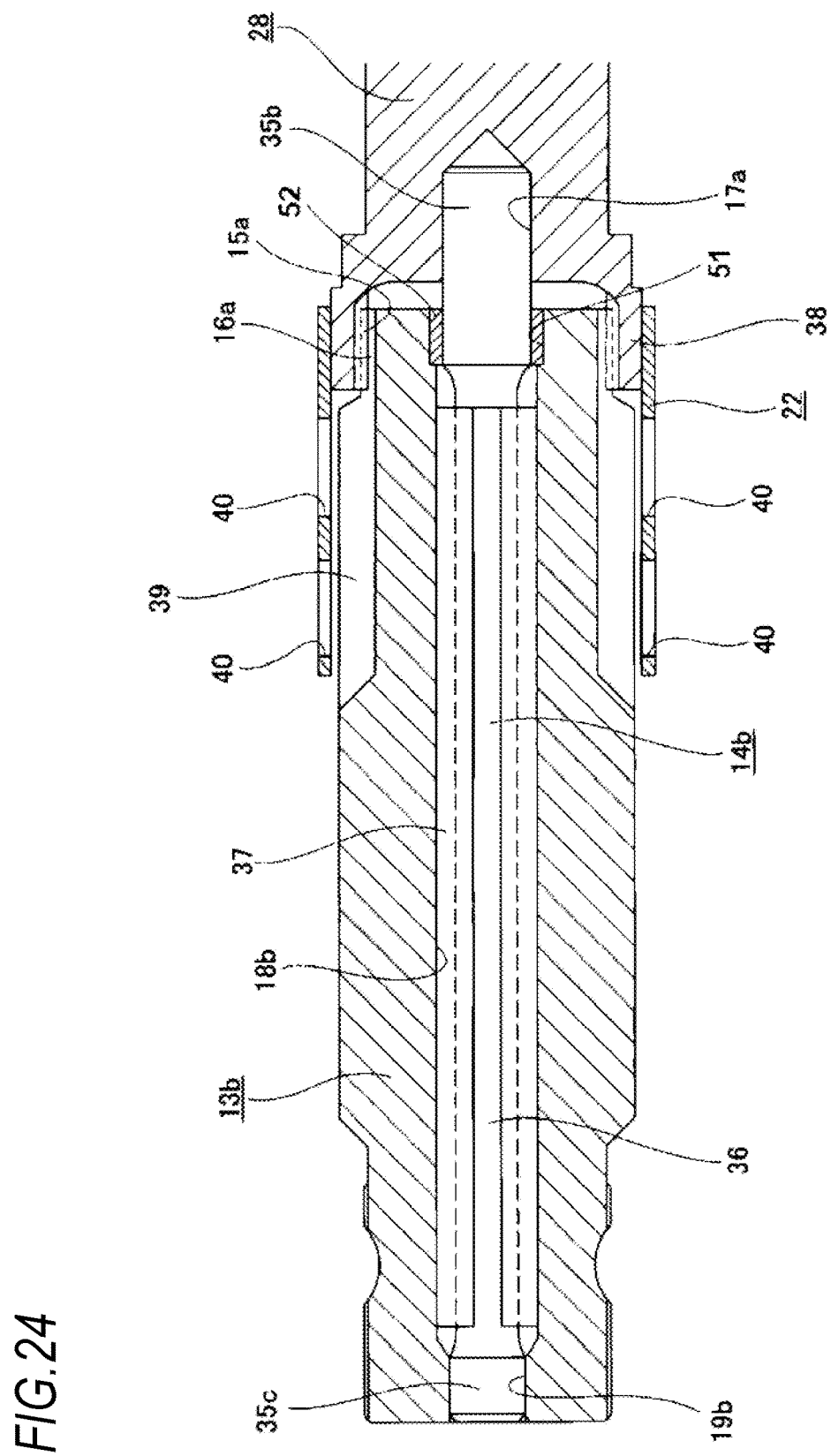
FIG. 24 is a similar view to FIG. 9, showing a thirteenth embodiment of the present invention.

FIG. 24 shows a thirteenth embodiment of the present invention. The thirteenth embodiment is different from the second embodiment, in that a tip portion of the center hole 18b of the output shaft 13b at a side of the lower shaft 28 is formed with a slide bush insertion hole 51 and a slide bush 52 is inserted (press-fitted) therein. The slide bush 52 is provided at the tip portion of the output shaft 13b at a side of the lower shaft 28, so that following effects are achieved.

That is, if the slide bush 52 is not provided at the tip portion of the output shaft 13b at a side of the lower shaft 28, the female stopper portion 15a of the lower shaft 28 may be diametrically distorted with respect to the male stopper portion 16a of the output shaft 13b due to the rotation of the lower shaft 28 accompanied by the rotation of the steering wheel 4. As a result, the detection precision of the torque sensor may be influenced.

However, when the slide bush 52 is inserted into the tip portion of the output shaft 13b at a side of the lower shaft 28 and the coupling shaft portion 35b of the torsion bar 14b is supported by the slide bush 52, like the thirteenth embodiment, it is possible to prevent a situation where the female stopper portion 15a of the lower shaft 28 is diametrically distorted with respect to the male stopper portion 16a of the output shaft 13b. As a result, it is possible to remove the influence on the detection precision of the torque sensor.

Since the other configurations and operations are the same as the second embodiment, the overlapping illustrations and descriptions are omitted.

Fourteenth Embodiment

Figure 25:
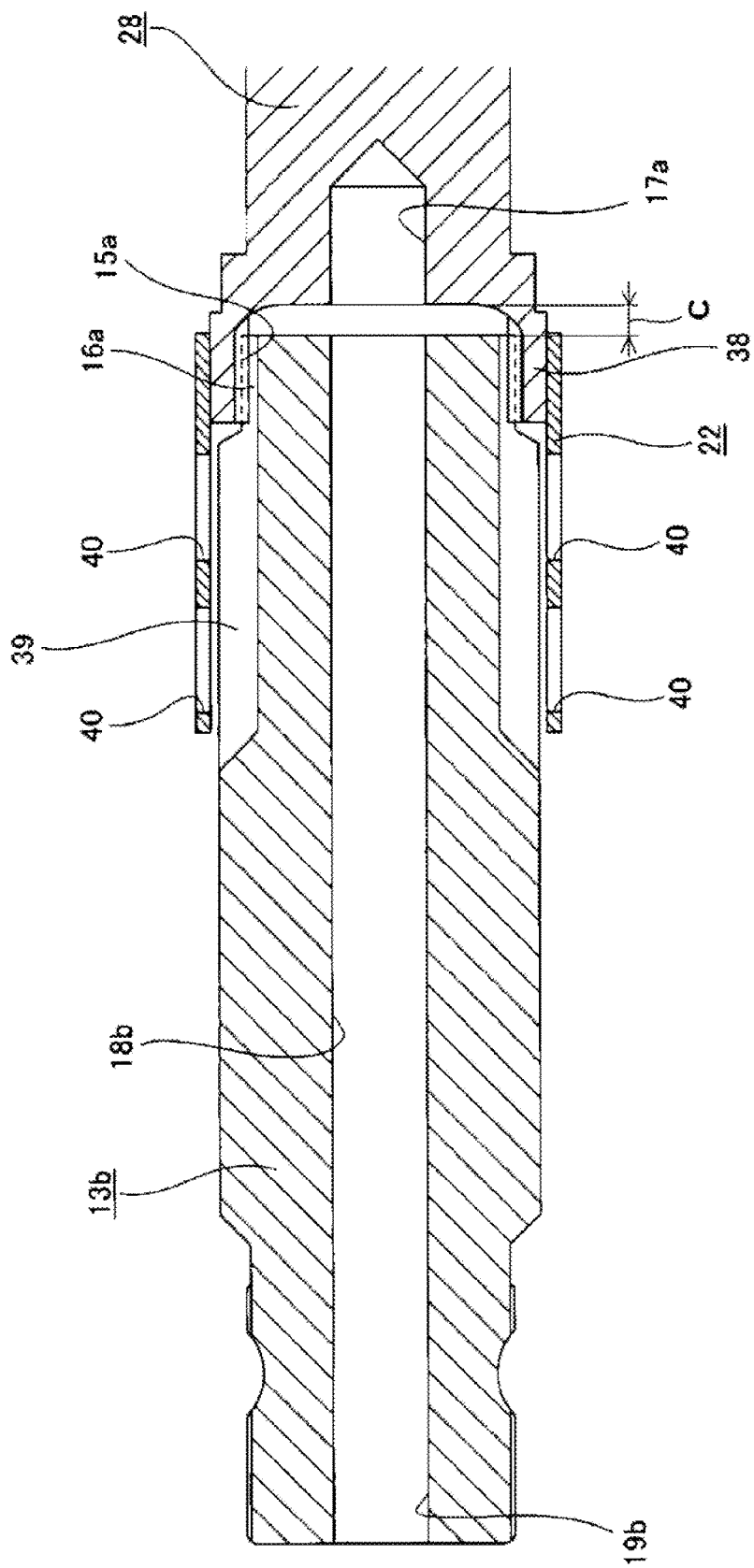
FIG. 25 is a sectional view showing a stage of assembling some components such as an input shaft, an output shaft and the like in a structure of a fourteenth embodiment of the present invention.
Figure 26:
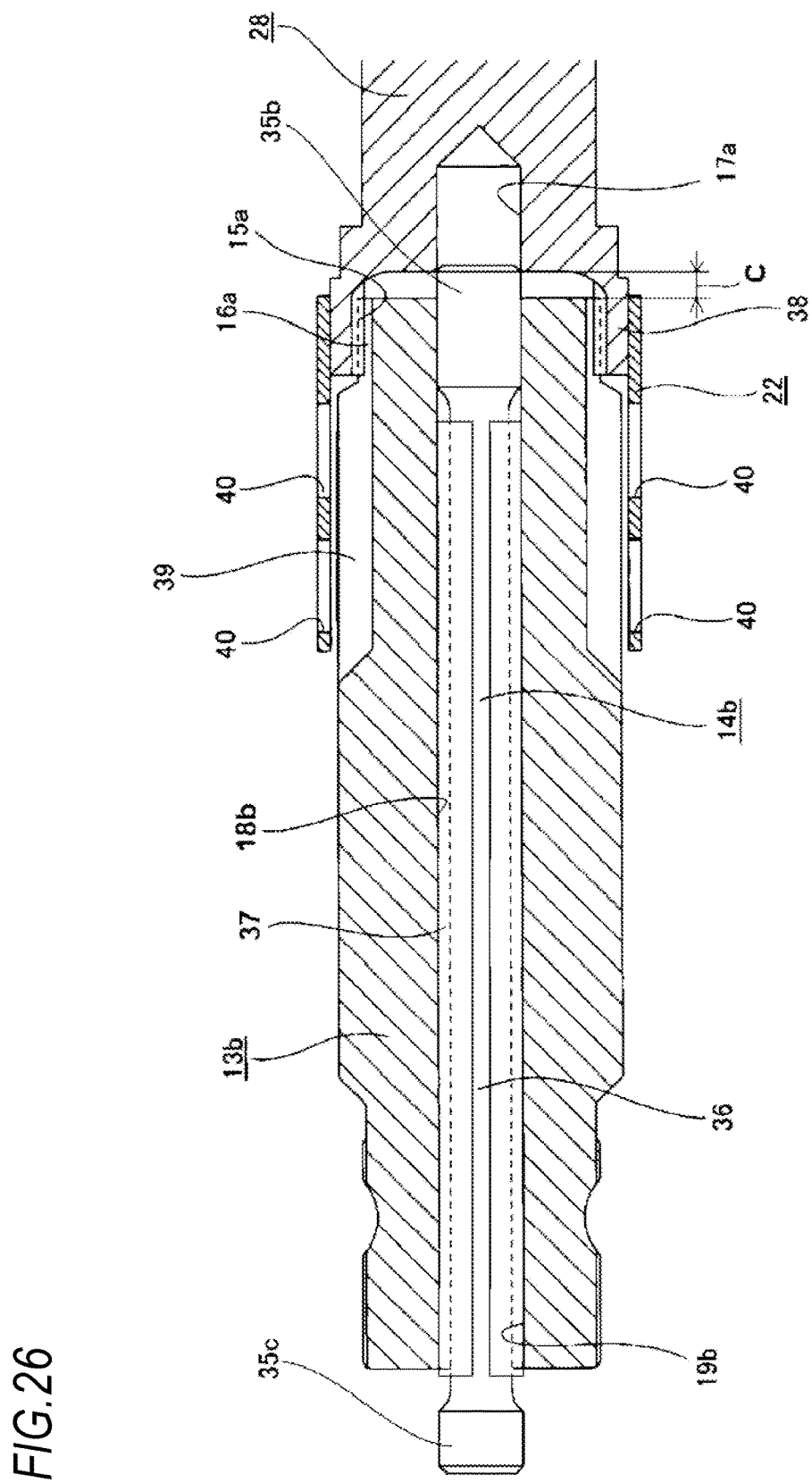
FIG. 26 is a sectional view showing a stage of the assembling of respective components subsequent to FIG. 25.
Figure 27:
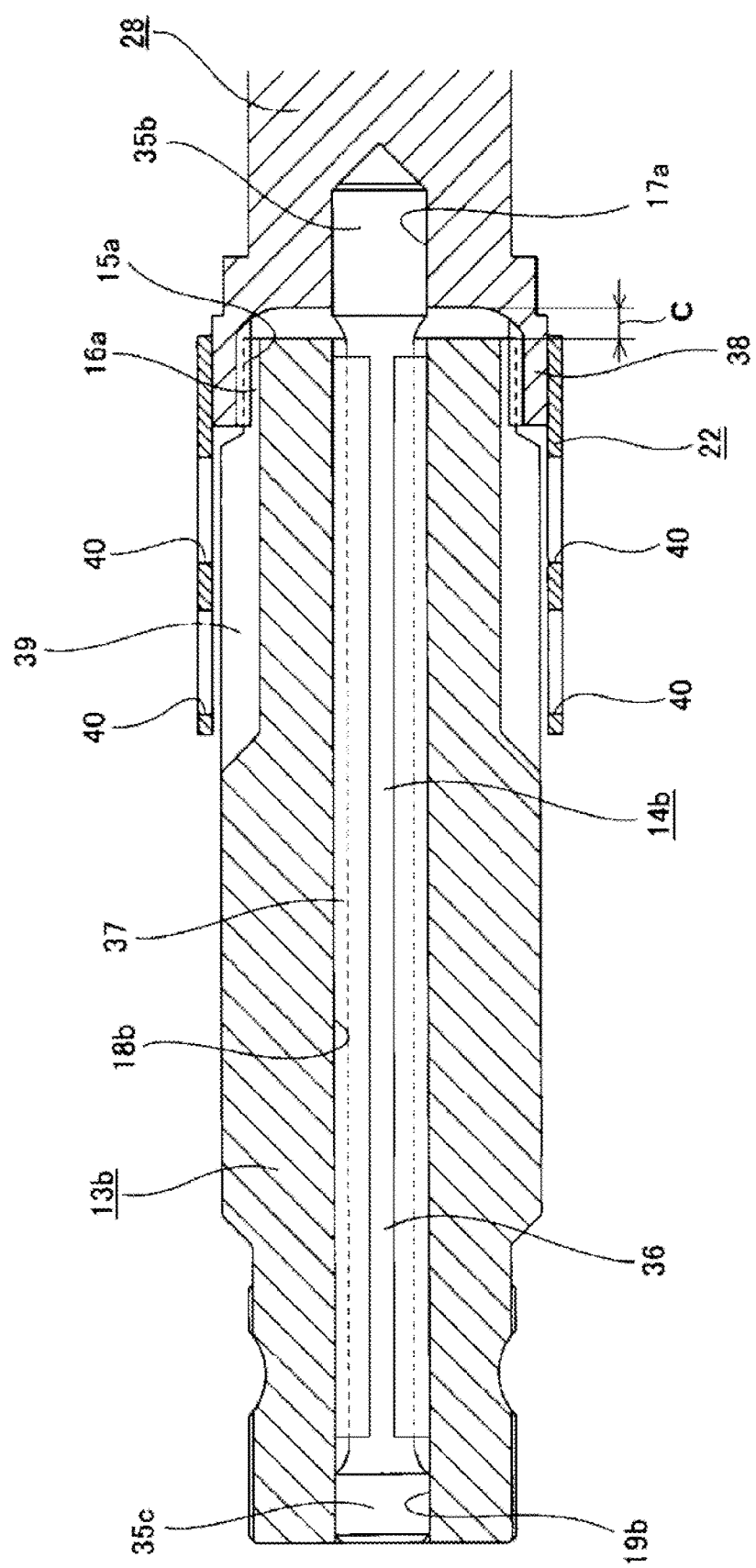
FIG. 27 is a sectional view showing a state after completion of the assembling of respective components.

A fourteenth embodiment of the present invention is described with reference to FIGS. 25 to 27. In FIGS. 25 to 27, the left side is a front side and the right side is a rear side.

In the fourteenth embodiment, as shown in FIGS. 25 to 27, an order of assembling the lower shaft 28, the output shaft 13b and the torsion bar 14b is different from the second embodiment.

That is, according to the fourteenth embodiment, as shown in FIG. 25, the base end portion of the torque detection sleeve 22 is first fitted and fixed on the cylindrical portion 38 of the lower shaft 28. Then, the rear end portion of the male stopper portion 16a provided on the outer peripheral surface of the rear end portion of the output shaft 13b and the front end portion of the female stopper portion 15a provided on the inner peripheral surface of the cylindrical portion 38 of the lower shaft 28 are engaged with each other with a circumferential gap therebetween. At the engagement of the male stopper portion 16a and the female stopper portion 15a, the lower shaft 28 and the output shaft 13b are respectively fixed by a jig (not shown).

Then, the engaged state between the male and female stopper portions 16a, 15a is made to be neutral in the circumferential direction, so that the positional relation between the lower shaft 28 and the output shaft 13b in the rotating direction is adjusted to the center position of the predetermined angle range.

In this case, a distance from the rear end portion of the output shaft 13b to the opening of the coupling hole 17a is kept to be the same as a distance C between the rear end portion of the output shaft 13b and the opening of the coupling hole 17a, which is formed when the torsion bar 14b is press-fitted into the lower shaft 28 and the output shaft 13b, as shown in FIG. 27.

Then, as shown in FIG. 26, at the state where the lower shaft 28 and the output shaft 13b are engaged and fixed to the jig (not shown), the torsion bar 14b having the buckling prevention member 37 arranged on the outer peripheral surface of the spring shaft portion is inserted into the center hole 18b of the torsion bar 14b from the front end-side of the output shaft 13b, and the coupling shaft portion 35b of the torsion bar 14b is engaged with the opening of the coupling hole 17a of the lower shaft 28.

Then, at this state, as shown in order of FIG. 26 and FIG. 27, the coupling shaft portion 35b is press-fitted into the coupling hole 17a and the coupling shaft portion 35c is press-fitted into the coupling hole 19b. Thereby, the coupling shaft portion 35b is coupled to the lower shaft 28 and the coupling shaft portion 35c is coupled to the output shaft 13b such that torque can be transmitted.

According to the fourteenth embodiment configured as described above, as shown with the order of FIG. 26 and FIG. 27, when press-fitting the coupling shaft portion 35b, which is an axial end portion of the torsion bar 14b, into the coupling hole 17a, it is possible to prevent the spring shaft portion 36 of the torsion bar 14b from buckling. That is, according to the fourteenth embodiment, when press-fitting the coupling shaft portion 35b into the coupling hole 17a, the axially high compressive force is applied to the spring shaft portion 36. However, even though the spring shaft portion 36 tends to buckle due to the axially high compressive force, the outer peripheral surface of the buckling prevention member 37 provided at the axially center portion of the spring shaft portion 36 is in contact with or is to contact the inner peripheral surface of the output shaft 13a, so that the buckling deformation is prevented.

Also, according to the fourteenth embodiment, at the assembling, as shown in FIG. 25, since it is possible to engage the axial end portions of the male and female stopper portion 16a, 15a each other before press-fitting the coupling shaft portion 35c into the coupling hole 19b, the positional relation between the lower shaft 28 and the output shaft 13b with respect to the rotating direction can be easily adjusted to the center position of the predetermined angle range. Therefore, it is possible to easily realize the normal assembled state.

Since the other configurations and operations are the same as the second embodiment, the overlapping illustrations and descriptions are omitted.

INDUSTRIAL APPLICABILITY

When implementing the present invention, as the method of fitting and supporting or coupling and fixing the buckling prevention member made of synthetic resin on the outer peripheral surface of the spring shaft portion, it is possible to adopt a method of attaching and melting powders of synthetic resin to the outer peripheral surface of the spring shaft portion or a method of dip the outer peripheral surface of the spring shaft portion to melted synthetic resin, in addition to the method of performing the injection molding on the outer diameter side of the spring shaft portion.

Also, at the implementation of the present invention, when fitting and supporting the cylindrical buckling prevention member made of synthetic resin on the outer peripheral surface of the spring shaft portion of the torsion bar, it is possible to fit and support the buckling prevention member on the outer peripheral surface of the spring shaft portion while making the outer diameter size of one coupling shaft portion of the pair of coupling shaft portions, which are both axial end portions of the torsion bar, smaller than the outer diameter size of the other coupling shaft portion, press-fitting the one coupling shaft portion into the inner diameter side of the buckling prevention member and enabling the one coupling shaft portion to axially pass through the inner diameter side of the buckling prevention member. In this case, if serration or spline is formed on the outer peripheral surface of the one coupling shaft portion, mountain portions of the serration or spline are bitten to the inner peripheral surface of the buckling prevention member when the one coupling shaft portion is press-fitted into the inner diameter side of the buckling prevention member and is enabled to axially pass through the inner diameter side. Therefore, the elastic diameter enlargement of the buckling prevention member is suppressed, so that it is possible to suppress the force necessary for the passing.

Also, at the implementation of the present invention, when the buckling prevention member is made of metal, a low frictional material such as synthetic resin may be coated to a portion of both inner and outer peripheral surfaces of the buckling prevention member, which is to be sliding-contacted to the circumferential surface of the counter-member at usage. When this configuration is adopted, a spring constant of the spring shaft portion is difficult to change at usage.

Also, the present invention can be implemented by appropriately combining the structures of the respective embodiments.

Also, at the implementation of the assembling method of the present invention, when arranging the buckling prevention member between the outer peripheral surface of the spring shaft portion of the torsion bar and the inner peripheral surface of the first shaft, a method of fitting and supporting or coupling and fixing the buckling prevention member on the outer peripheral surface of the spring shaft portion of the torsion bar and then inserting the torsion bar and the buckling prevention member into the inner diameter side of the first shaft may be adopted or a method of inserting the buckling prevention member into the inner diameter side of the first shaft and then inserting the spring shaft portion of the torsion bar into the inner diameter side of the buckling prevention member may be adopted. When the latter method is adopted, a gap is usually formed between the inner peripheral surface of the buckling prevention member and the outer peripheral surface of the spring shaft portion.

Also, the present invention can be applied to a structure where the first shaft is configured as the input shaft to which the steering force from the steering wheel is to be applied, like the structure disclosed in Patent Document 2, for example.

Also, the present invention can be applied to a structure where an assist mechanism including the first and second shafts and the torsion bar is provided for the steering gear unit.

Although the present invention has been described in detail with reference to the specific embodiments, it is apparent to one skilled in the art that various changes and modifications can be made without departing from the spirit and scope of the present invention.

The present invention is based on Japanese Patent Application Nos. 2014-043293 filed on Mar. 5, 2014 and 2014-160032 filed on Aug. 6, 2014, the contents of which are herein incorporated by reference.

DESCRIPTION OF REFERENCE NUMERALS

1: vehicle body
2, 2a: steering column
3, 3a: steering shaft
4: steering wheel
5a, 5b: universal joint
6: intermediate shaft
7: steering gear unit
8: input shaft
9: tie-rod
10: electric motor
11, 11a: housing
12: input shaft
13, 13a, 13b: output shaft
14, 14a, 14b, 14c: torsion bar
15, 15a: female stopper portion
16, 16a: male stopper portion
17, 17a: coupling hole
18, 18a, 18b: center hole
19, 19a, 19b, 19c: coupling hole
20, 20a: through hole
21, 21a: pin
22: torque detection sleeve
23: torque detection coil unit
24: worm-type decelerator
25: inner column
26: outer column
27: support bracket
28: lower shaft
29: upper shaft
30: cover body
31: main body
32: bolt
33: ball bearing
34: ball bearing
35a, 35b, 35c, 35d: coupling shaft portion
36: spring shaft portion
37, 37a to 37j: buckling prevention member
38: cylindrical portion
39: torque detection concavo-convex portion 40: window hole
41: coil
42: worm wheel
43: guide shaft portion
44, 44a: guide hole
51: sliding bush insertion hole
52: sliding bush

What is claimed is:

1. An electric power steering device of the present invention includes:
   a hollow first shaft;
   a second shaft which is arranged coaxially with the first shaft; and
   a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted,
   wherein at least one of the coupling shaft portions is press-fitted into a coupling hole formed in a counter-shaft which is one of the first and second shafts, to which the one of the coupling shaft portions is to be coupled,
   wherein a steering force from a steering wheel is applied to either one of the first and second shafts,
   wherein a buckling prevention member is fitted and supported or coupled and fixed on an outer peripheral surface of the spring shaft portion, and an outer peripheral surface of the buckling prevention member is positioned close to or in contact with an inner peripheral surface of the first shaft, and
   wherein the buckling prevention member includes a cylindrical member which has a cut-out extending in parallel or inclined with respect to a center axis thereof formed at one position in a circumferential direction.

2. The electric power steering device according to claim 1,
   wherein the buckling prevention member is fitted and supported or coupled and fixed on a portion including an axially center portion of the outer peripheral surface of the spring shaft portion.

3. The electric power steering device according to claim 1,
   wherein the buckling prevention member includes a synthetic resin member which is injection-molded on an outer diameter side of the spring shaft portion.

4. The electric power steering device according to claim 1,
   wherein the buckling prevention member includes a rubber member which is vulcanization-bonded on the outer peripheral surface of the spring shaft portion.

5. The electric power steering device according to claim 1,
   wherein the first shaft has a center hole, a tip portion of the center hole at a side of the second shaft is formed with a slide bush insertion hole, and a slide bush is inserted into the slide bush insertion hole.

6. An electric power steering device of the present invention includes:
   a hollow first shaft;
   a second shaft which is arranged coaxially with the first shaft; and
   a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted,
   wherein at least one of the coupling shaft portions is press-fitted into a coupling hole formed in a counter-shaft which is one of the first and second shafts, to which the one of the coupling shaft portions is to be coupled,
   wherein a steering force from a steering wheel is applied to either one of the first and second shafts,
   wherein a buckling prevention member is fitted and supported or coupled and fixed on an outer peripheral surface of the spring shaft portion, and an outer peripheral surface of the buckling prevention member is positioned close to or in contact with an inner peripheral surface of the first shaft, and
   wherein the buckling prevention member includes a cylindrical heat-shrinkable tube.

7. An electric power steering device of the present invention includes:
   a hollow first shaft;
   a second shaft which is arranged coaxially with the first shaft; and
   a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted,
   wherein at least one of the coupling shaft portions is press-fitted into a coupling hole formed in a counter-shaft which is one of the first and second shafts, to which the one of the coupling shaft portions is to be coupled,
   wherein a steering force from a steering wheel is applied to either one of the first and second shafts,
   wherein a buckling prevention member is fitted and supported or coupled and fixed on an outer peripheral surface of the spring shaft portion, and an outer peripheral surface of the buckling prevention member is positioned close to or in contact with an inner peripheral surface of the first shaft,
   wherein a first stopper portion provided on one axial portion of the first shaft and a second stopper portion provided on one axial portion of the second shaft are engaged with each other with a circumferential gap therebetween such that relative rotations of the first and second shafts are restrained within a predetermined angle range,
   wherein the one of the coupling shaft portions is coupled to the first shaft,
   wherein the other of the coupling shaft portions is press-fitted into a coupling hole formed in the second shaft, and
   wherein there is a size relation that at assembly at least portions of the first and second stopper portions can be engaged with each other with a circumferential gap therebetween.

8. The electric power steering device according to claim 7,
wherein the one of the coupling shaft portions is press-fitted into a coupling hole formed in the first shaft,
wherein the other of the coupling shaft portions abuts on a bottom end portion of the coupling hole, and
wherein the portions of the first and second stopper portions that are engaged with each other with the circumferential gap therebetween at assembly is at a state where the other of the coupling shaft portions is press-fitted into the coupling hole formed in the second shaft and abuts on the bottom end portion of the coupling hole, after the buckling prevention member is arranged between the outer peripheral surface of the spring shaft portion of the torsion bar and the inner peripheral surface of the first shaft and before press-fitting the one of the coupling shaft portion into the coupling hole formed in the first shaft.

9. A method of assembling the electric power steering device according to claim 8, the method comprising:
arranging the bucking prevention member of the torsion bar between the outer peripheral surface of the spring shaft portion and the inner peripheral surface of the first shaft at a state where the other of the coupling shaft portions of the torsion bar is press-fitted into the coupling hole formed in the second shaft to abut on the bottom end portion of the coupling hole;
engaging at least portions of the first and second stopper portions each other with a circumferential gap therebetween; and
press-fitting the one of the coupling shaft portions into the coupling hole formed in the first shaft at a state where a positional relation between the first and second shafts in a rotating direction is adjusted to a center position of the predetermined angle range.

10. The electric power steering device according to claim 8,
wherein the buckling prevention member is fitted and supported or coupled and fixed on a portion including an axially center portion of the outer peripheral surface of the spring shaft portion.

11. The electric power steering device according to claim 8,
wherein the buckling prevention member includes a synthetic resin member which is injection-molded on an outer diameter side of the spring shaft portion.

12. The electric power steering device according to claim 8,
wherein the buckling prevention member includes a rubber member which is vulcanization-bonded on the outer peripheral surface of the spring shaft portion.

13. The electric power steering device according to claim 8,
wherein the first shaft has a center hole, a tip portion of the center hole at a side of the second shaft is formed with a slide bush insertion hole, and a slide bush is inserted into the slide bush insertion hole.

14. The electric power steering device according to claim 7,
wherein the one of the coupling shaft portions is press-fitted into a coupling hole formed in the first shaft,
wherein the other of the coupling shaft portions abuts on a bottom end portion of the coupling hole, and
wherein the portions of the first and second stopper portions that are engaged with each other with the circumferential gap therebetween at assembly, is at a state before press-fitting of the coupling shaft portions such that while press-fitting the other of the coupling shaft portions into the coupling hole formed in the second shaft to abut on the bottom end portion of the coupling hole and the one of the coupling shaft portions is press-fitted into the coupling hole formed in the first shaft after the torsion bar arranged with the buckling prevention member is inserted into the inner diameter side of the first shaft.

15. A method of assembling the electric power steering device according to claim 14, the method comprising:
engaging at least portions of the first and second stopper portions each other with a circumferential gap therebetween;
inserting the torsion bar arranged with the buckling prevention member into the inner diameter side of the first shaft at a state where a positional relation between the first and second shafts in a rotating direction is adjusted to a center position of the predetermined angle range; and
press-fitting the other of the coupling shaft portions into the coupling hole formed in the second shaft to abut on the bottom end portion of the coupling hole, and press-fitting the one of the coupling shaft portions into the coupling hole formed in the first shaft.

16. The electric power steering device of claim 7, wherein the coupling of the one of the coupling shaft portions to the first shaft is such that torque can be transmitted and axial relative displacement is prevented,
wherein the portions of the first and second stopper portions that are engaged with each other with the circumferential gap therebetween at assembly is at a state after the buckling prevention member is arranged between the outer peripheral surface of the spring shaft portion of the torsion bar and the inner peripheral surface of the first shaft and the one of the coupling shaft portions is coupled to the first shaft such that torque can be transmitted and axial relative displacement is prevented and before press-fitting the other of the coupling shaft portions into the coupling hole formed in the second shaft.

17. A method of assembling the electric power steering device according to claim 16, the method comprising:
arranging the buckling prevention member between the outer peripheral surface of the spring shaft portion of the torsion bar and the inner peripheral surface of the first shaft and coupling the one of the coupling shaft portions to the first shaft such that torque can be transmitted and axial relative displacement is prevented;
engaging at least portions of the first and second stopper portions each other with a circumferential gap therebetween; and
press-fitting the other of the coupling shaft portions into the coupling hole formed in the second shaft at a state where a positional relation between the first and second shafts in a rotating direction is adjusted to a center position of the predetermined angle range.

* * * * *